US012503227B2

(12) United States Patent
Xu et al.

(10) Patent No.: US 12,503,227 B2
(45) Date of Patent: Dec. 23, 2025

(54) VERTICAL TAKE-OFF AND LANDING AIRCRAFT AND CONTROL METHOD OF VERTICAL TAKE-OFF AND LANDING AIRCRAFT

(71) Applicants: Sichuan Aerofugia Technology Development Co., Ltd., Chengdu (CN); ZHEJIANG GEELY HOLDING GROUP CO., LTD., Hangzhou (CN)

(72) Inventors: Zhaohua Xu, Chengdu (CN); Songbai Xue, Chengdu (CN); Qiang Tu, Chengdu (CN); Yongxiang Sha, Chengdu (CN); Liang Guo, Chengdu (CN); Junchang Luo, Chengdu (CN); Shaiming Xie, Chengdu (CN)

(73) Assignees: Sichuan Aerofugia Technology Development Co., Ltd., Chengdu (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 18/893,998

(22) Filed: Sep. 24, 2024

(65) Prior Publication Data
US 2025/0010986 A1    Jan. 9, 2025

Related U.S. Application Data

(63) Continuation of application No. PCT/CN2024/078914, filed on Feb. 28, 2024.

(30) Foreign Application Priority Data

Mar. 3, 2023   (CN) .......................... 202310203250.4
Dec. 7, 2023   (CN) .......................... 202311670924.8

(51) Int. Cl.
*B64C 29/00*    (2006.01)

(52) U.S. Cl.
CPC ...... *B64C 29/0016* (2013.01); *B64C 29/0025* (2013.01); *B64C 29/0033* (2013.01)

(58) Field of Classification Search
CPC ............ B64C 29/0016; B64C 29/0025; B64C 29/0033; B64U 10/20
See application file for complete search history.

(56) References Cited

U.S. PATENT DOCUMENTS 9,908,619 B1    3/2018  Beckman et al.
11,643,200 B2 *  5/2023  Lee .................... B64D 27/31
                                                    244/12.3

(Continued)

FOREIGN PATENT DOCUMENTS

CN    107406141 A    11/2017
CN    113120230 A    7/2021

(Continued)

*Primary Examiner* — Nicholas McFall

(57) ABSTRACT

A vertical take-off and landing aircraft includes a fuselage, 2N tilting rotors, and 2N fixed rotors. Wings of a fixed-wing structure are arranged on two sides of the fuselage. An empennage is arranged at a tail of the fuselage. The 2N tilting rotors are symmetrically installed on two sides of the fuselage and located on the front and rear sides of the wings respectively. The 2N fixed rotors are symmetrically installed on the wings on both sides of the fuselage, located on the front and rear sides of the wings respectively and on the outer sides of the tilting rotors. N is a natural number greater than or equal to 2. In a vertical take-off and landing configuration, projections of all the tilting rotors and all the fixed rotors on a horizontal plane are approximately centrally symmetrical about the center of gravity of the aircraft.

13 Claims, 16 Drawing Sheets

(56) References Cited

U.S. PATENT DOCUMENTS

| | | | |
|---|---|---|---|
| 12,006,033 B1 * | 6/2024 | Villa | ................. B64U 50/19 |
| 2022/0009626 A1 | 1/2022 | Baharav et al. | |
| 2024/0002048 A1 * | 1/2024 | Wang | ................. B64C 27/26 |

FOREIGN PATENT DOCUMENTS

| | | |
|---|---|---|
| CN | 217416106 U | 9/2022 |
| CN | 218258708 U | 1/2023 |
| KR | 20210088052 A | 7/2021 |
| WO | 2022229201 A1 | 11/2022 |

* cited by examiner

VERTICAL TAKE-OFF AND LANDING AIRCRAFT AND CONTROL METHOD OF VERTICAL TAKE-OFF AND LANDING AIRCRAFT

CROSS REFERENCE TO RELATED APPLICATION

The present application is a continuation application of PCT Application No. PCT/CN2024/078914, filed on Feb. 28, 2024, which claims the benefit of priority to a Chinese Patent Application number CN202310203250.4, filed on Mar. 3, 2023, and a Chinese Patent Application number CN202311670924.8, filed on Dec. 7, 2023, the disclosure of the above application is hereby incorporated by reference in their entireties for all purposes.

TECHNICAL FIELD

The present disclosure relates to the technical field of aircrafts, specifically to a vertical take-off and landing (VTOL) aircraft and a control method for the VTOL aircraft.

BACKGROUND

A vertical take-off and landing fixed-wing aircraft (distributed propulsion) not only has the vertical take-off and landing capability of a helicopter but also has the efficient and high-speed cruise flight capability of a fixed-wing aircraft. Compared with helicopters, the VTOL fixed-wing aircraft is quieter, more comfortable and more economical; compared with multi-rotors, the VTOL fixed-wing aircraft is more efficient and has longer range; compared with fixed-wing aircraft, the VTOL fixed-wing aircraft can take off and land vertically on urban platforms, making the VTOL fixed-wing aircraft an excellent choice for urban air mobility. There are three main configurations of VTOL fixed-wing aircraft: Lift+Cruise configuration, full thrust vectoring configuration, and partial thrust vectoring configuration. Each configuration has different advantages and disadvantages, making it difficult to achieve an optimal balance. The Lift+Cruise configuration has havier power units, leading to a large weight proportion. Additionally, the cruise flight of the Lift+Cruise configuration also has higher cruise flight drag because of lifting propellers. The combined effect of the two results in lower maximum flight speed and range performance. The full thrust vectoring configuration has complex mechanical structures, aerodynamic characteristics, and control methods, making it generally less safe than the Lift+Cruise configuration. The partial thrust vectoring configuration aims to combine the advantages of both, but the currently disclosed partial thrust vectoring configurations cannot simultaneously provide the benefits of both. Therefore, it is necessary to propose a novel vertical take-off and landing fixed-wing aircraft configuration to balance the advantages and disadvantages, so as to balance the flight performance, safety, reliability, and technical difficulty of the vertical take-off and landing fixed-wing aircraft.

SUMMARY

The present disclosure provides a VTOL aircraft and a control method for the VTOL aircraft to optimize the configuration of VTOL aircraft in the prior art.

To achieve the above objectives and other related purposes, the present disclosure provides a VTOL aircraft, including a fuselage, 2N tilting rotors, and 2N fixed rotors. Wings are arranged on both sides of the fuselage, with the wings being of a fixed-wing structure. An empennage is arranged at a tail of the fuselage. The 2N tilting rotors are symmetrically installed on two sides of the fuselage, located on the front and rear sides of the wings; the 2N fixed rotors are symmetrically installed on the wings on both sides of the fuselage, located on the front and rear sides of the wings, and positioned on outer sides of the tilting rotors, where N is a natural number greater than or equal to 2. In a vertical take-off and landing configuration, projections of all the tilting rotors on a horizontal plane are approximately centrally symmetrical about the center of gravity of the VTOL aircraft; the projections of all the fixed rotors on the horizontal plane are also approximately centrally symmetrical about the center of gravity of the VTOL aircraft.

In an example of the vertical take-off and landing aircraft according to the present disclosure, at least some of the 2N tilting rotors are arranged on the front side of the center of gravity, and at least some thereof are arranged on the rear side of the center of gravity.

In an example of the vertical take-off and landing aircraft according to the present disclosure, the tilting rotors on the front side of the center of gravity are installed on the wing by booms or on the fuselage on the front side of the wing by support arms.

In an example of the vertical take-off and landing aircraft according to the present disclosure, the vertical take-off and landing aircraft includes four tilting rotors and four fixed rotors, the four fixed rotors are symmetrically installed on two sides of the fuselage, the four tilting rotors are distributed on inner sides of the four fixed rotors, and the tilting rotors are located on the front sides and the rear sides of the wings.

In an example of the vertical take-off and landing aircraft according to the present disclosure, the empennage is any one of a V-tail, a Y-tail, an X-tail, a T-tail, an H-tail, a TT-tail, or a U-tail. Some of the tilting rotors are installed on the empennage, and the tilting rotors on the empennage are installed on the upper side of the empennage, can provide forward thrust for forward flight of the aircraft, and tilt upward to provide vertical thrust in the vertical take-off and landing configuration of the aircraft.

In an example of the vertical take-off and landing aircraft according to the present disclosure, the empennage is a V-tail, two tilting rotors are installed on the empennage, and the two tilting rotors are installed on wingtips on two sides of the upper portion of the empennage respectively.

In an example of the vertical take-off and landing aircraft according to the present disclosure, at least some of the 2N fixed rotors are arranged on the front side of the center of gravity, and at least some thereof are arranged on the rear side of the center of gravity.

In an example of the vertical take-off and landing aircraft according to the present disclosure, booms are installed on the wings on both sides of the fuselage, and the 2N fixed rotors are symmetrically installed on the booms on both sides of the fuselage, and are located on the front sides and the rear sides of the wings respectively.

In an example of the vertical take-off and landing aircraft according to the present disclosure, the tilting rotor includes a tilting propeller and a tilting driving device. A base of the tilting driving device is fixed on the empennage or on the front side of the wing, and the tilting propeller is installed at the moving end of the tilting driving device.

In an example of the vertical take-off and landing aircraft according to the present disclosure, all the tilting rotors are approximately centrally symmetrical, which means that all the tilting rotors are installed on a first circular ring concentric with a first circumference, which has the center of gravity of the vertical take-off and landing aircraft as center and the first circumference where the 2N tilting rotors are ideally located central symmetry as reference. The diameter of the first circumference is set to D1, the inner ring of the first circular ring is formed by inward deviation by 20% of D1 from the first circumference, and an outer ring of the first circular ring is formed by outward deviation by 20% of D1 from the first circumference.

In an example of the vertical take-off and landing aircraft according to the present disclosure, all the fixed rotors are approximately centrally symmetrical, which means that all the fixed rotors are installed on a second circular ring concentric with a second circumference, which has the center of gravity of the vertical take-off and landing aircraft as center and the second circumference where the 2N fixed rotors are ideally located central symmetry as reference. The diameter of the second circumference is set to D2, an inner ring of the second circular ring is formed by inward deviation by 20% of D2 from the second circumference, and an outer ring of the second circular ring is formed by outward deviation by 20% of D2 from the second circumference.

In an example of the vertical take-off and landing aircraft according to the present disclosure, the 2N tilting rotors include at least two full thrust vectoring rotors, and all the full thrust vectoring rotors are symmetrically arranged with respect to the symmetry plane of the fuselage.

The present disclosure further provides a control method for the vertical take-off and landing aircraft according to any one of the implementations described above. The control method includes: a transition process from vertical take-off to level flight and/or a transition process from level flight to vertical landing as follows:

the transition process from vertical take-off to level flight includes:

tilting, by the power system, the 2N tilting rotors forward based on the forward flight command;

configuring the tilting rate of the 2N tilting rotors and the thrust ratio of the 2N tilting rotors to the 2N fixed rotors according to the climb command, so as to control the climb rate and the climb gradient of the aircraft; and the transition process from level flight to vertical landing includes:

tilting, by the power system, the 2N tilting rotors upward to the vertical take-off and landing position according to the speed command; and configuring the tilting rate of the 2N tilting rotors and the thrust ratio of the 2N tilting rotors to the 2N fixed rotors according to the descent command, so as to control the descent speed and the descent gradient of the aircraft.

In an example of the vertical take-off and landing aircraft of the present disclosure, the control method further includes the process of regulating unexpected entry into a spin or stall and/or the process of regulating when encountering crosswinds:

The process of regulating unexpected entry into a spin or stall comprises: activating the 2N fixed rotors to assist in attitude control, thereby recovering from the spin or stall; and The process of regulating when encountering crosswinds comprises: when the wind speed exceeds a set threshold, assisting yaw control by differentially adjusting the thrust of the 2N tilting rotors to counteract the crosswind.

In the vertical take-off and landing configuration, the VTOL aircraft of the present disclosure has all the tilting rotors' projections on the horizontal plane approximately centrally symmetrical about the center of gravity of the VTOL aircraft; in addition, the fixed rotors are arranged on outer sides of the tilting rotors on two sides, and projections of all the fixed rotors on the horizontal plane are approximately centrally symmetrical about the center of gravity of the vertical take-off and landing aircraft. This configuration can reduce the thrust that needs to be output by remaining power units in the event of a single rotor failure, thereby ensuring safe flight of the aircraft. In addition, according to the present disclosure, through the special layout form, the advantages of Lift+Cruise configuration, full thrust vectoring configuration, and partial thrust vectoring configurations can be combined, and this layout can be more stable, and reduce the design and installation difficulty of the vertical take-off and landing aircraft, which is beneficial to rapid advancement of product commercialization process. Additionally, positioning all the tilting rotors inward the fixed rotors, as opposed to positioning them outward, reduces the yaw moment in the event of a partial thrust vectoring rotor failure. This significantly lowers the requirements for vertical tail capacity (vertical tail area x vertical tail force arm), and expand a safe flight envelope after partial failure of the tilting rotor.

BRIEF DESCRIPTION OF DRAWINGS

To describe the technical solutions in the embodiments of the present disclosure or in the prior art more clearly, the following briefly describes the accompanying drawings required for describing the embodiments or the prior art. Clearly, the accompanying drawings in the following description merely show some embodiments of the present disclosure, and a person of ordinary skill in the art can still derive other drawings from these accompanying drawings without creative efforts.

DESCRIPTION OF REFERENCE SIGNS OF ELEMENTS

Figure 1:
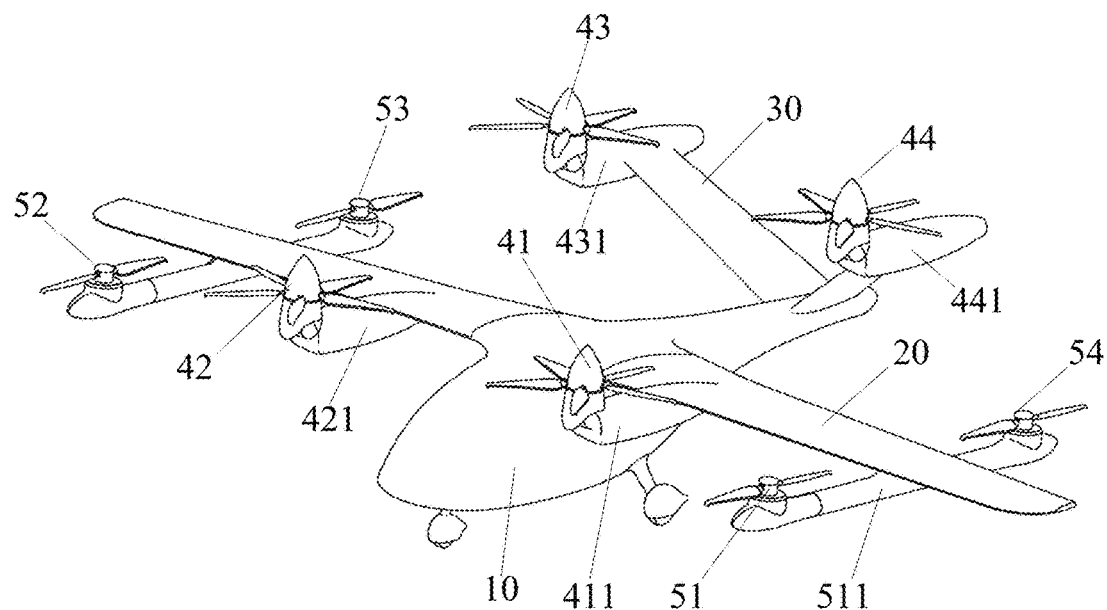
FIG. 1 is an axonometric drawing of a vertical take-off and landing aircraft according to an embodiment of the present disclosure in a vertical take-off and landing configuration.

10. Fuselage; 20. Wing; 30. Empennage; 41. First tilting rotor; 411. Third boom; 42. Second tilting rotor; 421. Fourth boom; 43. Third tilting rotor; 431. Fifth boom; 44. Fourth tilting rotor; 441. Sixth boom; 401. Tilting propeller; 51. First fixed rotor; 511. First boom; 52. Second fixed rotor; 521. Second boom; 53. Third fixed rotor; 54. Fourth fixed rotor; 60. First support arm; 70. First circumference; 80. Second circumference; 90. Second support arm.

DESCRIPTION OF EMBODIMENTS

The following describes implementations of the present disclosure by using specific examples. A person skilled in the art may easily understand other advantages and effects of the present disclosure based on content disclosed in this specification. The present disclosure may be further implemented or applied by using other different specific implementations. Various details in this specification may also be modified or altered based on different viewpoints and applications without departing from the present disclosure. It should be noted that the following embodiments and features in the embodiments may be mutually combined when there are no conflicts. It should be further understood that terms used in the embodiments of the present disclosure are used to describe specific implementation solutions, and are not used to limit the protection scope of the present disclosure. In the following embodiments, test methods not marked with specific conditions are usually performed based on conventional conditions or based on conditions recommended by manufacturers.

When a value range is provided in an embodiment, it should be understood that unless otherwise stated in the present disclosure, two endpoints in each value range and any value between the two endpoints can be selected. Unless otherwise defined, all technical and scientific terms used in the present disclosure are consistent with mastery of the prior art by a person skilled in the art and the descriptions of the present disclosure, and the present disclosure may be further implemented by using any method, device, or material in the prior art that is similar or equivalent to a method, device, or material described in the embodiments of the present disclosure.

It should be noted that terms such as "upper", "lower", "left", "right", "middle", and "one" that are referred in this specification are merely used for ease of description, and are not intended to limit the scope of implementation of the present disclosure. A change or an adjustment of a relative relationship thereof also falls within the scope of implementation of the present disclosure when the technical content is not substantially changed.

Referring to FIG. 1 to FIG. 33, the present disclosure provides a vertical take-off and landing aircraft and a control method for a vertical take-off and landing aircraft, so as to optimize a layout of a vertical take-off and landing aircraft in the prior art, especially a layout suitable for an eVTOL manned aircraft.

Referring to FIG. 1 to FIG. 17, the vertical take-off and landing aircraft includes a fuselage 10, 2N tilting rotors, and 2N fixed rotors. The fuselage 10 is of a symmetrical structure and has a symmetry plane extending in a length direction of the fuselage (that is, a vertical plane where a straight line AB is located in FIG. 2), and the remaining structure and shape of the fuselage 10 are not limited. Reference may be made to the structure of the fuselage 10 of an existing aircraft. For example, the fuselage 10 includes common operation systems of an aircraft such as an avionics system, a flight control system, an electrical system, and a navigation system that are installed on the fuselage 10. Wings 20 are arranged on two sides of the fuselage 10, and the wings 20 on both sides are symmetrical about the symmetry plane of the fuselage 10. For the structure of the wing 20, reference may be made to a fixed-wing structure of the existing aircraft, and details are not described herein. An empennage 30 is arranged at a tail of the fuselage 10, and the empennage 30 is integrally formed with or mechanically connected to the fuselage 10 and is symmetrical about the symmetry plane of the fuselage 10. In the present disclosure, N is a natural number greater than or equal to 2. The 2N tilting rotors are symmetrically installed on two sides of the fuselage 10 and located on the front sides and rear sides of the wings 20 respectively. The 2N tilting rotors are symmetrically arranged in pairs with respect to the symmetry plane of the fuselage 10. Installation methods and positions of the 2N tilting rotors on the front sides and the rear sides of the wings 20 are not limited, provided that projections of all the tilting rotors on a horizontal plane are approximately centrally symmetrical about a center of gravity (that is, point G in FIG. 2 or FIG. 17) of the vertical take-off and landing aircraft in a vertical take-off and landing configuration (that is, when rotating shafts of all the tilting rotors are tilted upward to a vertical take-off and landing position).

As shown in FIG. 1 to FIG. 8, in an embodiment, tilting rotors on the front side of each wing 20 can be installed on the wing 20 by booms respectively (for example, a first tilting rotor 41 is installed on the front side of the wing 20 by a third boom 411, and a second tilting rotor 42 is installed on the front side of the wing 20 by a fourth boom 421), and tilting rotors on the rear side of each wing 20 can be installed on the empennage 30 by booms (for example, a third tilting rotor 43 is installed on the empennage 30 by a fifth boom 431, and a fourth tilting rotor 44 is installed on the empennage 30 by a sixth boom 441). As shown in FIG. 9 to FIG. 16, in another embodiment, different from that in FIG. 1 to FIG. 8, tilting rotors on the front side of the wing 20 are installed on the fuselage 10 on the front side of the wing 20 by a first support arm 60 (for example, the first tilting rotor 41 and the second tilting rotor 42 are installed on the fuselage 10 on the front side of the wing 20 by the first support arm 60). As shown in FIG. 18 to FIG. 27, in some other embodiments of the present application, tilting rotors on the front side of the wing 20 are installed on the wing by booms, and tilting rotors on the rear side of the wing are installed on the fuselage on the rear side of the wing by a support arm. In some other embodiments of the present application, tilting rotors on the front and rear sides of the wing 20 may alternatively be installed on the wing 20 by booms, or tilting rotors on the front and rear sides of the wing 20 may be installed on the fuselage 10 by support arms, or tilting rotors on the front and rear sides of the wing 20 may be directly installed on the front and rear sides of the wing 20. It should be noted that, in the above embodiments, although methods for installing the 2N tilting rotors are different, the projections on the horizontal plane are all approximately centrally symmetrical about the center of gravity (that is, point G in FIG. 2 or FIG. 17) of the vertical take-off and landing aircraft.

Figure 2:
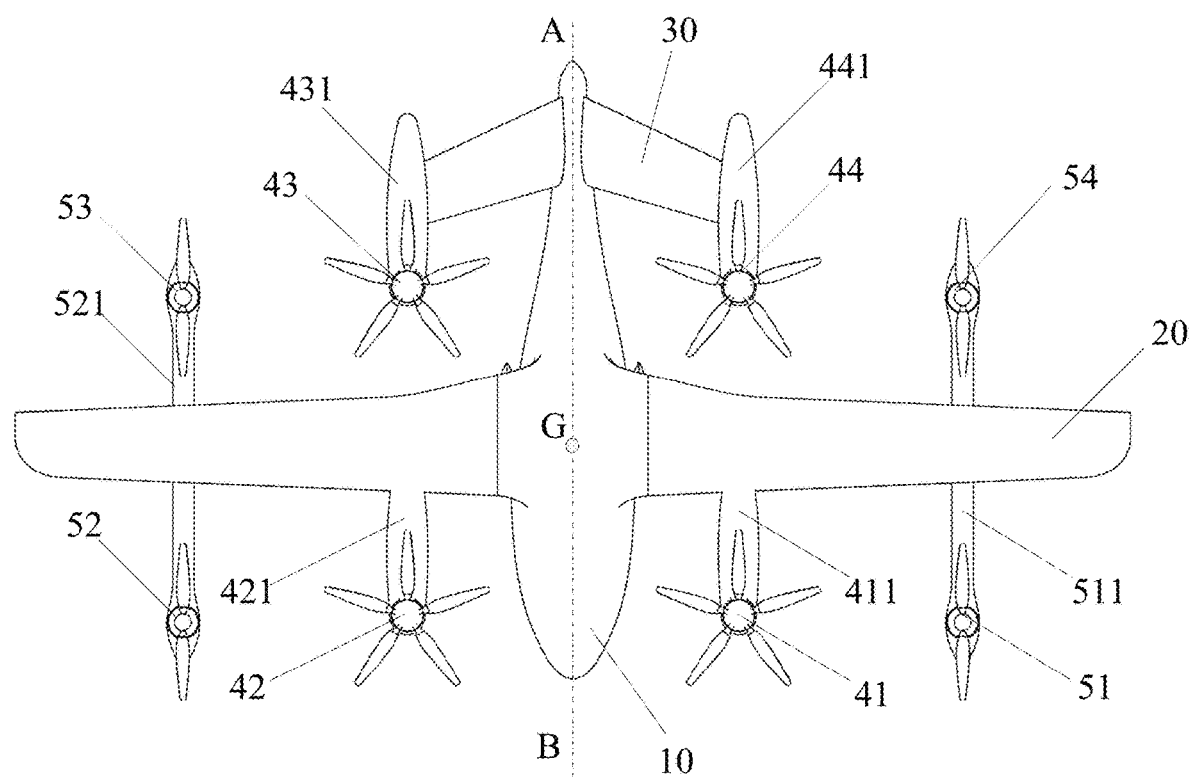
FIG. 2 is a top view of the vertical take-off and landing aircraft in FIG. 1.
Figure 3:
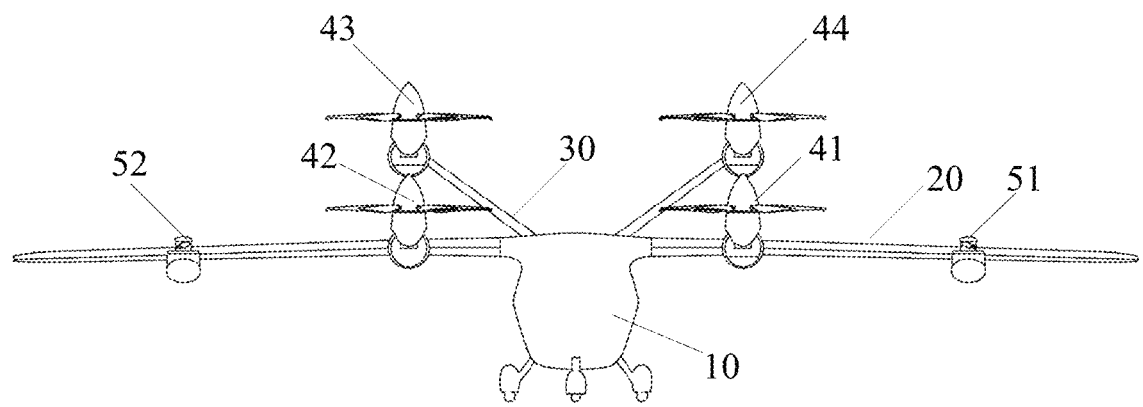
FIG. 3 is a front view of the vertical take-off and landing aircraft in FIG. 1.
Figure 4:
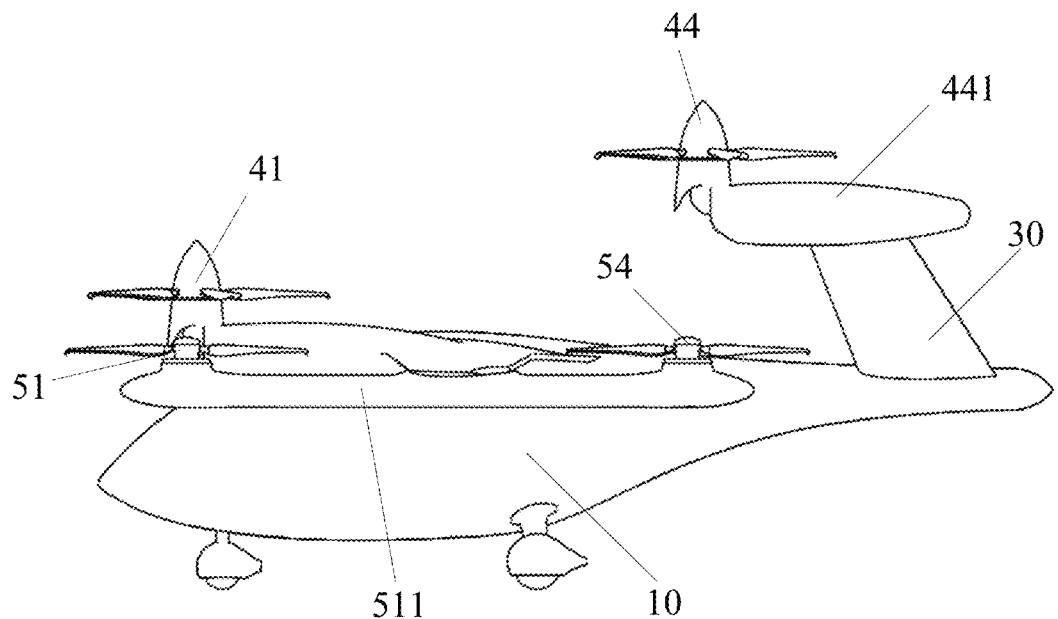
FIG. 4 is a right view of FIG. 3.
Figure 5:
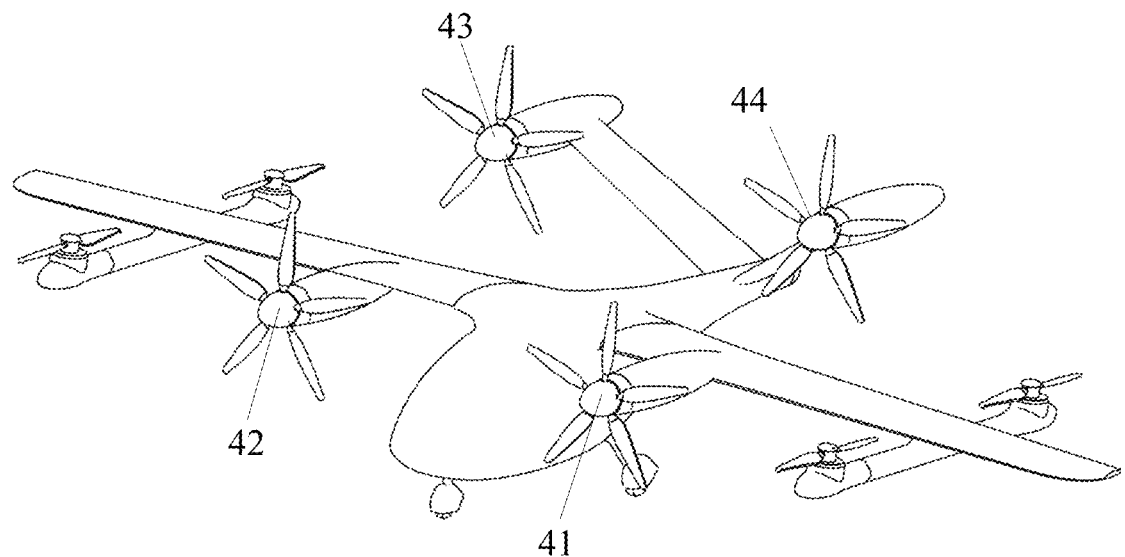
FIG. 5 is an axonometric drawing of the vertical take-off and landing aircraft in FIG. 1 in a level flight state.
Figure 6:
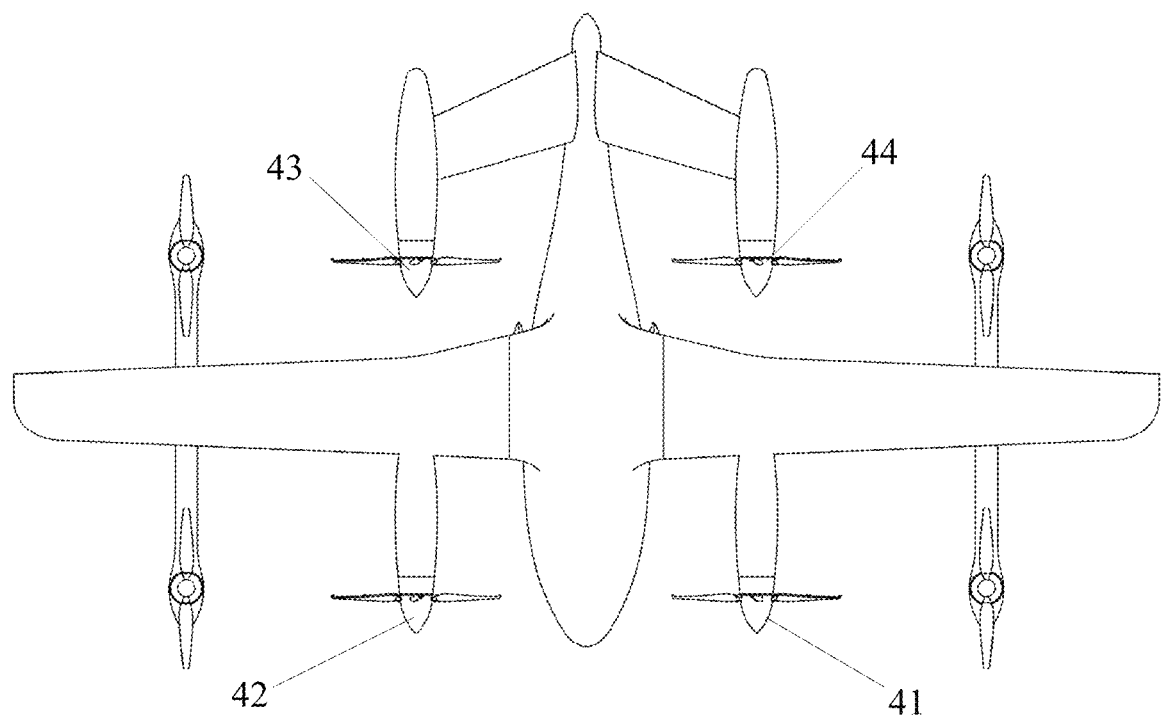
FIG. 6 is a top view of FIG. 5.
Figure 7:
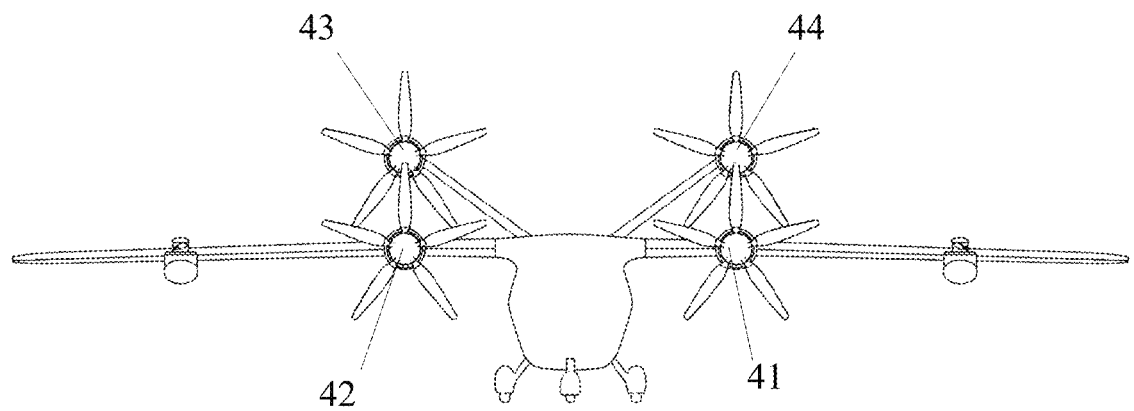
FIG. 7 is a front view of FIG. 5.
Figure 8:
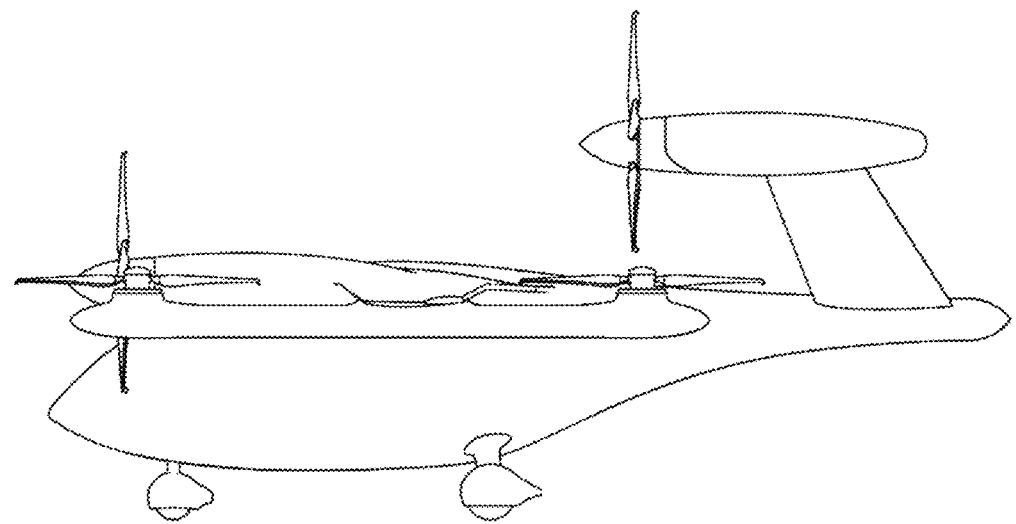
FIG. 8 is a side view of FIG. 7.
Figure 9:
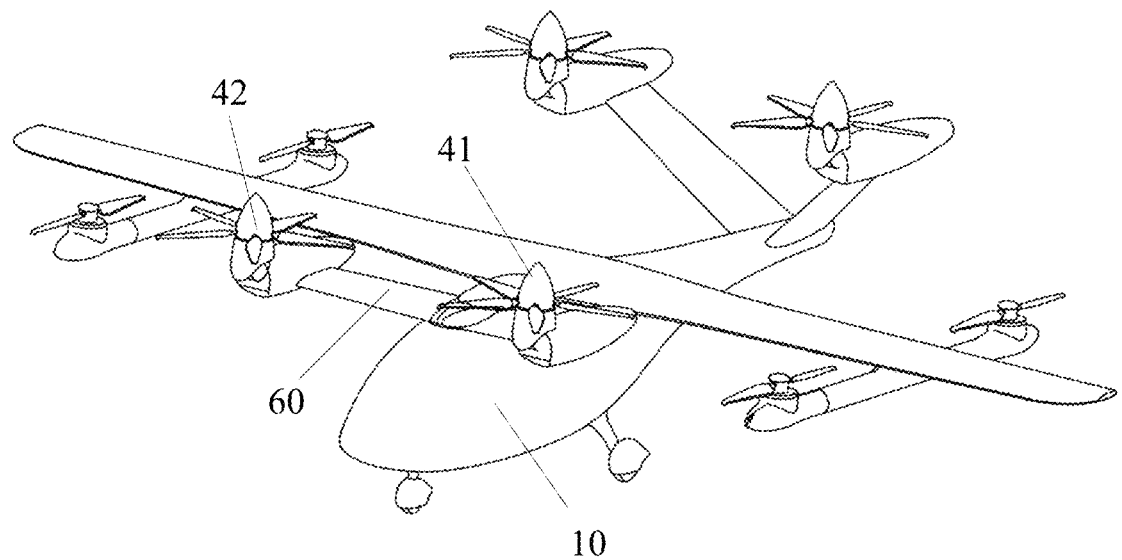
FIG. 9 is an axonometric drawing of a vertical take-off and landing aircraft according to another embodiment of the present disclosure in a vertical take-off and landing configuration.
Figure 10:
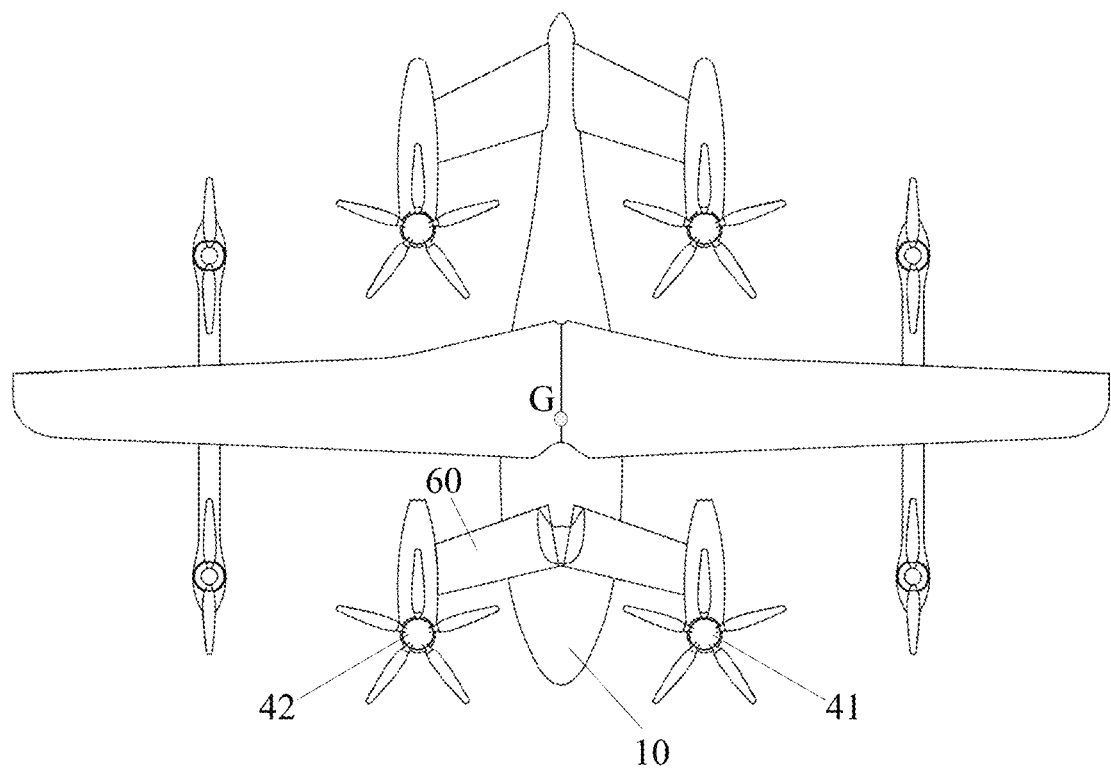
FIG. 10 is a top view of the vertical take-off and landing aircraft in FIG. 9.
Figure 11:
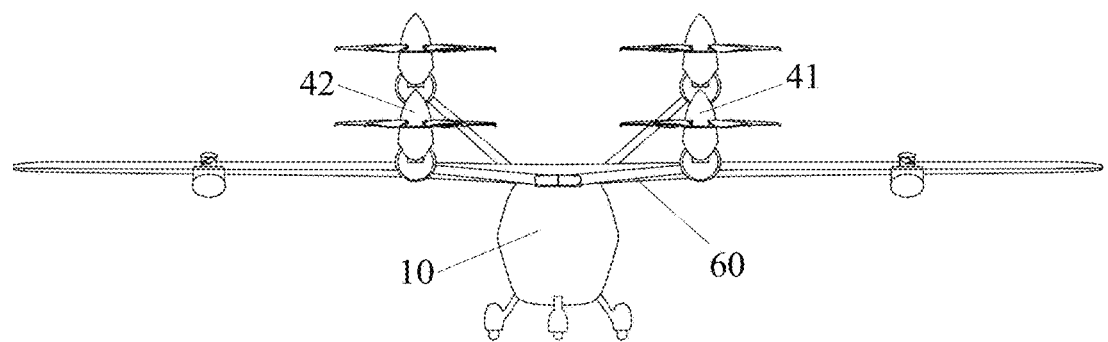
FIG. 11 is a front view of the vertical take-off and landing aircraft in FIG. 9.

Referring to FIG. 2 and FIG. 10, the 2N fixed rotors are symmetrically installed on two sides of the fuselage 10 and located on the outer sides of the tilting rotors. A first boom 511 is installed on the wing 20 on one side of the fuselage 10 and a second boom 521 is installed on the wing 20 on the other side of the fuselage 10. The first boom 511 and the second boom 521 are symmetrically arranged with respect to the symmetry plane of the fuselage 10. The 2N fixed rotors are symmetrically installed on the first boom 511 and the second boom 521 on both sides of the fuselage 10 respectively, and are located on the front sides and the rear sides of the wings 20 and at the front ends and rear ends of the first boom 511 and the second boom 521 respectively. In addition, all the projections of the fixed rotors on the horizontal plane are approximately centrally symmetrical in pairs with respect to the center of gravity (point G) of the vertical take-off and landing aircraft. It should be noted that in the present disclosure, the fixed rotors are located on the outer sides of all the tilting rotors, which may be the outer sides in any direction, and the specific direction may be unlimited. However, to optimize the structure and reduce the weight, the 2N fixed rotors are located on spanwise outer sides of all the tilting rotors in this embodiment.

In a vertical take-off and landing configuration, projections of all the tilting rotors on the horizontal plane are approximately centrally symmetrical about the center of gravity of the vertical take-off and landing aircraft; the fixed rotors are arranged on the outer sides of the tilting rotors on two sides, and the projections of all the fixed rotors on the horizontal plane are approximately centrally symmetrical about the center of gravity of the vertical take-off and landing aircraft. In this layout, the thrust that needs to be output by remaining power groups can be reduced in the case of single rotor failure. According to the present disclosure, the advantages of the Lift+Cruise configuration, full thrust vectoring configuration, and partial thrust vectoring configuration can be taken into account, and this layout method can reduce narrowing of a transition corridor caused by tilting, and reduce the design and installation difficulty of the vertical take-off and landing aircraft, which is beneficial to rapid advancement of a product commercialization process. In addition, in this layout form, all the tilting rotors are arranged on the inner sides of the fixed rotors. This, compared with the layout method in which tilting rotors are arranged on outer sides, can reduce a yaw moment after partial failure of the tilting rotors, greatly lower requirements for vertical tail capacity, and expand a safe flight envelope after partial failure of the tilting rotors.

In an embodiment of the vertical take-off and landing aircraft according to the present disclosure, some of the 2N tilting rotors are installed on the empennage 30, and the remaining tilting rotors are installed on the fuselage 10 and/or the wing 20. In an extension direction of the fuselage, at least some of the 2N tilting rotors are arranged on the front side of the center of gravity of the vertical take-off and landing aircraft, and at least some of the 2N tilting rotors are arranged on the rear side of the center of gravity of the vertical take-off and landing aircraft. At least some of the 2N fixed rotors are arranged on the front side of the center of gravity of the vertical take-off and landing aircraft, and at least some of the 2N fixed rotors are arranged on the rear side of the center of gravity of the vertical take-off and landing aircraft. This can help to implement the balance of multiple force couples and make the vertical take-off and landing process of the vertical take-off and landing aircraft more stable.

Referring to FIG. 2 and FIG. 10, in an embodiment, the vertical take-off and landing aircraft includes four tilting rotors and four fixed rotors. The four fixed rotors are symmetrically installed on two sides of the fuselage 10, and the four tilting rotors are located on the inner sides of the four fixed rotors. Two tilting rotors are installed on the empennage 30, and the other two tilting rotors are installed on the fuselage 10 on the front side of the wing 20 or the wing 20. The four tilting rotors are divided into two groups with equal amounts, labeled as a first group of tilting rotors and a second group of tilting rotors. The first group of tilting rotors is installed on the fuselage 10 or the wing 20 on the front side of the center of gravity G of the vertical take-off and landing aircraft, and the second group of tilting rotors is installed on the empennage 30 on the rear side of the center of gravity of the vertical take-off and landing aircraft. The first group of tilting rotors includes a first tilting rotor 41 and a second tilting rotor 42, and the second group of tilting rotors includes a third tilting rotor 43 and a fourth tilting rotor 44. A third boom 411 is arranged on the wing 20 on one side of the fuselage 10, and a symmetrical fourth boom 421 is arranged on the wing 20 on the other side of the fuselage 10. The first tilting rotor 41 is installed on the third boom 411, and the second tilting rotor 42 is installed on the fourth boom 421 and is symmetrical with the first tilting rotor 41 with respect to the symmetry plane of the fuselage 10. A fifth boom 431 is arranged on the empennage 30 on one side of the fuselage 10, and a symmetrical sixth boom 441 is arranged on the empennage 30 on the other side of the fuselage 10. The third tilting rotor 43 is installed on the fifth boom 431, and the fourth tilting rotor 44 is installed on the sixth boom 441 and is symmetrically arranged with the third tilting rotor 43 with respect to the symmetry plane of the fuselage 10. The third tilting rotor 43 and the fourth tilting rotor 44 are symmetrically arranged with respect to the symmetry plane of the fuselage 10. In a vertical take-off and landing configuration, the rotating shafts of the four tilting rotors all tilt upward in a vertical direction, and the first tilting rotor 41, the second tilting rotor 42, the third tilting rotor 43, and the fourth tilting rotor 44 are all distributed near a first circumference 70 with the center of gravity G of an electric vertical take-off and landing aircraft. Projections of the first tilting rotor 41 and the third tilting rotor 43 on the horizontal plane are approximately centrally symmetrical about the center of gravity of the vertical take-off and landing aircraft, and projections of the second tilting rotor 42 and the fourth tilting rotor 44 on the horizontal plane are approximately centrally symmetrical about the center of gravity of the vertical take-off and landing aircraft. The four fixed rotors are divided into two groups with equal amounts, labeled as a first group of fixed rotors and a second group of fixed rotors. The first group of fixed rotors is installed on the wing 20 on the front side of the center of gravity of the vertical take-off and landing aircraft, and the second group of fixed rotors is installed on the wing 20 on the rear side of the center of gravity of the vertical take-off and landing aircraft. The first group of fixed rotors includes a first fixed rotor 51 and a second fixed rotor 52, and the second group of fixed rotors includes a third fixed rotor 53 and a fourth fixed rotor 54. The first fixed rotor 51, the second fixed rotor 52, the third fixed rotor 53, and the fourth fixed rotor 54 are all distributed near a second circumference 80 with the center of gravity G of the electric vertical take-off and landing aircraft as the center. The first fixed rotor 51 and the second fixed rotor 52 are symmetrical about the symmetry plane of the fuselage 10, and the third fixed rotor 53 and the fourth fixed rotor 54 are also symmetrical about the symmetry plane of the fuselage 10. The rotating shafts of the four fixed rotors all extend upward in the vertical direction. Projections of the first fixed rotor 51 and the third fixed rotor 53 on the horizontal plane are approximately centrally symmetrical about the center of gravity of the vertical take-off and landing aircraft, and projections of the second fixed rotor 52 and the fourth fixed rotor 54 on the horizontal plane are approximately centrally symmetrical about the center of gravity of the vertical take-off and landing aircraft. It should be noted that in the present application, the front side refers to an extension direction toward a nose, and the rear side refers to an extension direction toward the side of the empennage 30.

Referring to FIG. 18 to FIG. 22, the present disclosure further provides a vertical take-off and landing aircraft. The vertical take-off and landing aircraft differs from the vertical take-off and landing aircraft in FIG. 2 in that an empennage 30 of the vertical take-off and landing aircraft is T-shaped, and a third tilting rotor 43 and a fourth tilting rotor 44 are not installed on the empennage 30, but are installed on a fuselage between the empennage 30 and a wing 20 by a second support arm 90. In this solution, the four tilting rotors on the inner sides are also approximately centrally symmetrical in pairs with respect to the center of gravity of the vertical take-off and landing aircraft, and the four fixed rotors on the outer sides are also approximately centrally symmetrical in pairs with respect to the center of gravity of the vertical take-off and landing aircraft. This layout can also have the advantages of the vertical take-off and landing aircraft in FIG. 2.

In addition, it should be noted that existing tilting rotors include "full thrust vectoring rotors" and "partial thrust vectoring rotors". The existing "full thrust vectoring rotor" and "partial thrust vectoring rotor" each include a rotor and a power pod. The rotation of the rotor provides a lifting force, and a motor which drives the rotor to rotate, or other control components can be installed in the power pod. The "partial thrust vectoring rotor" commonly cuts off the power pod. During the tilting of the rotor, a part close to the rotor tilts with the rotor, and a part away from the rotor is relatively fixed to the fuselage. In the "full thrust vectoring rotor", the whole power pod tilts with the corresponding rotor. Considering the complexity of an airflow field and flight safety during flight, the way to arrange tilting rotors and fixed rotors for optimizing the airflow anti-interference ability and flight stability of the vertical take-off and landing aircraft will be a great challenge. In the present application, the 2N tilting rotors may all be "partial thrust vectoring rotors", or may all be "full thrust vectoring rotors", or some may be "partial thrust vectoring rotors" and some may be "full thrust vectoring rotors".

Figure 28:
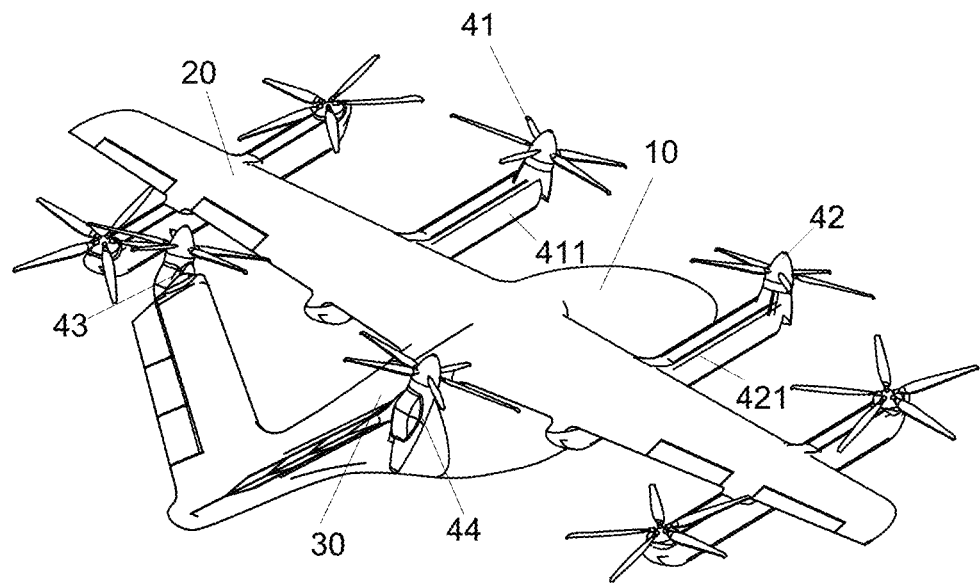
FIG. 28 is a three-dimensional view of a vertical take-off and landing aircraft according to still another embodiment of the present disclosure in a vertical take-off and landing configuration.
Figure 29:
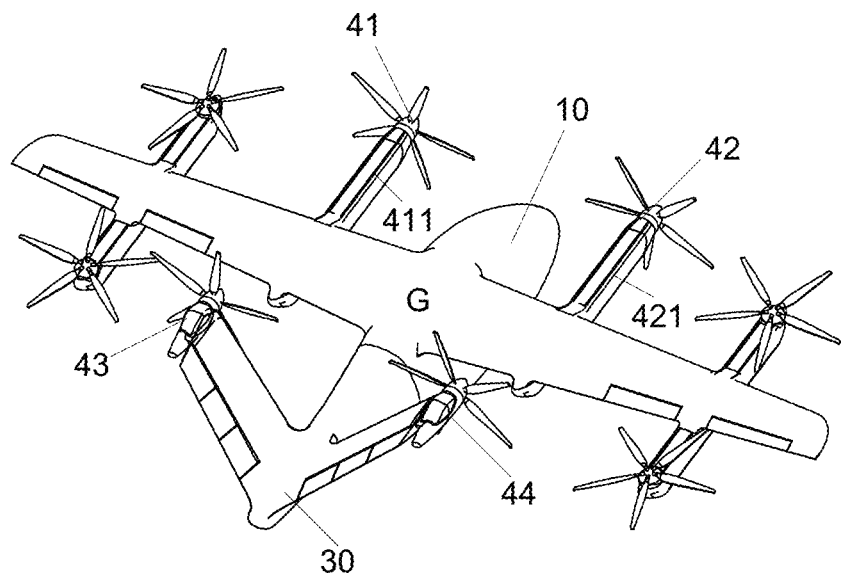
FIG. 29 is a three-dimensional view of a vertical take-off and landing aircraft according to still another embodiment of the present disclosure in a level flight state.

Referring to FIG. 28 and FIG. 29, the present disclosure further provides a vertical take-off and landing aircraft. The vertical take-off and landing aircraft differs from the vertical take-off and landing aircraft in FIG. 2 in that 2N tilting rotors include at least two full thrust vectoring rotors, and all the full thrust vectoring rotors are symmetrically arranged with respect to a symmetry plane of a fuselage 10. In an embodiment, a third tilting rotor 43 and a fourth tilting rotor 44 on an empennage 30 on the rear side of a wing 20 of the vertical take-off and landing aircraft are full thrust vectoring rotors, and a first tilting rotor 41 and a second tilting rotor 42 on the front side of the wing 20 are partial thrust vectoring rotors. In a vertical take-off and landing configuration, the first tilting rotor 41, the second tilting rotor 42, the third tilting rotor 43 and the fourth tilting rotor 44 all tilt upward to a vertical take-off and landing position and are approximately centrally symmetrical in pairs with respect to a center of gravity of the vertical take-off and landing aircraft, and four fixed rotors on outer sides are approximately centrally symmetrical in pairs with respect to the center of gravity of the vertical take-off and landing aircraft. This layout can also have the advantages of the vertical take-off and landing aircraft in FIG. 2. It can be understood by a person skilled in the art that all tilting rotors may alternatively all be configured in the form of full thrust vectoring rotors if the installation conditions permit.

Figure 30:
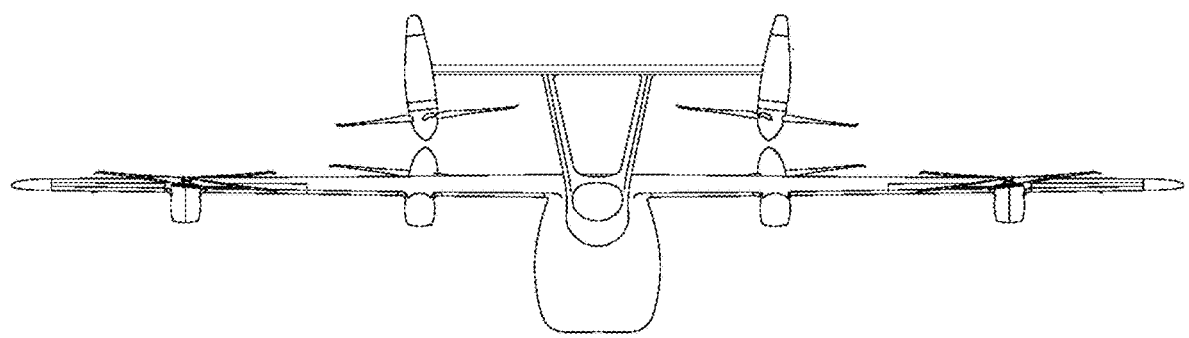
FIG. 30 is a rear view of a vertical take-off and landing aircraft according to yet another embodiment of the present disclosure in a vertical take-off and landing configuration.
Figure 31:
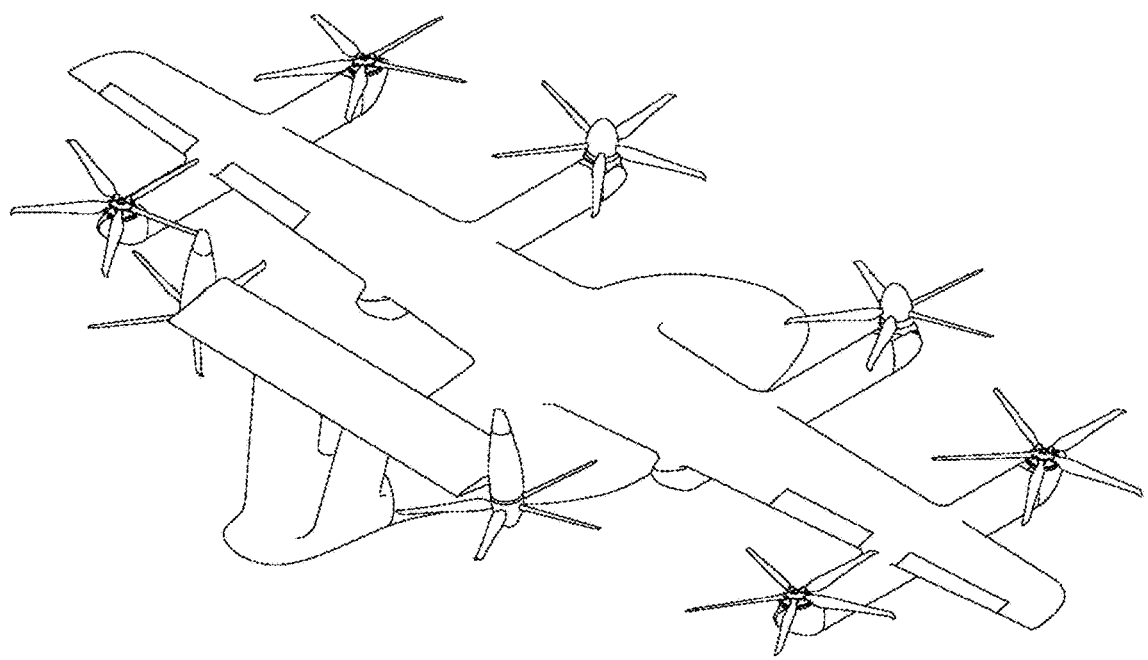
FIG. 31 is a three-dimensional view of a vertical take-off and landing aircraft according to yet another embodiment of the present disclosure in a vertical take-off and landing configuration.
Figure 32:
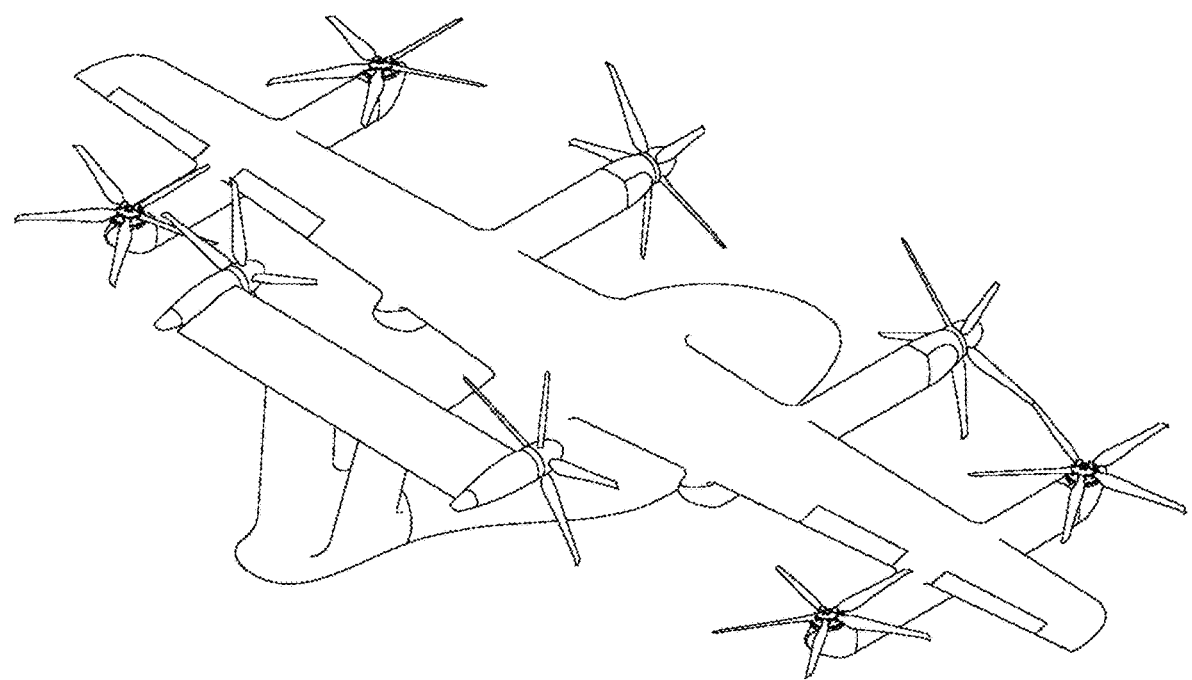
FIG. 32 is a three-dimensional view of a vertical take-off and landing aircraft according to yet another embodiment of the present disclosure in a level flight state.

Referring to FIG. 30 to FIG. 32, the present disclosure further provides a vertical take-off and landing aircraft. The vertical take-off and landing aircraft differs from the vertical take-off and landing aircraft in FIG. 2 in that an empennage 30 of the vertical take-off and landing aircraft is a TT-tail, and a third tilting rotor and a fourth tilting rotor on the empennage are installed on two sides of a horizontal tail of the TT-tail, and are configured to tilt downward to a vertical take-off and landing position. The third tilting rotor and the fourth tilting rotor may be full thrust vectoring rotors or partial thrust vectoring rotors. In this embodiment, the third tilting rotor and the fourth tilting rotor are full thrust vectoring rotors. In a vertical take-off and landing configuration, the four tilting rotors on the inner sides are also approximately centrally symmetrical in pairs with respect to the center of gravity of the vertical take-off and landing aircraft, and the four fixed rotors on the outer sides are also approximately centrally symmetrical in pairs with respect to the center of gravity of the vertical take-off and landing aircraft. This layout can also have the advantages of the vertical take-off and landing aircraft in FIG. 2.

Referring to FIG. 23 to FIG. 27, the present disclosure further provides a vertical take-off and landing aircraft. The vertical take-off and landing aircraft differs from the vertical take-off and landing aircraft in FIG. 2 in that a third tilting rotor 43 and a fourth tilting rotor 44 are not installed on a V-tail 30, but are installed on a fuselage between the empennage 30 and a wing 20 by a second support arm 90. In this solution, the four tilting rotors on the inner sides are also approximately centrally symmetrical in pairs with respect to the center of gravity of the vertical take-off and landing aircraft, and the four fixed rotors on the outer sides are also approximately centrally symmetrical in pairs with respect to the center of gravity of the vertical take-off and landing aircraft. This layout can also have the advantages of the vertical take-off and landing aircraft in FIG. 2.

In the present disclosure, in order to implement the rotor distribution on the front and rear sides of the center of gravity, and implement plane symmetry and approximate central symmetry, the number of tilting rotors is at least four, or of course, may be six, eight, or more even numbers without considering energy, provided that tilting rotors are added on the basis of the above four tilting rotors to make the newly added tilting rotors also satisfy the plane symmetry and central symmetry. In the present application, the number of fixed rotors is at least four, or of course, may be six, eight, or more even numbers without considering energy, provided that fixed rotors are added on the basis of the above four fixed rotors and located on outer sides of all the tilting rotors to make the newly added fixed rotors also satisfy the plane symmetry and approximate central symmetry.

In the present disclosure, the empennage 30 may be any one of a V-tail, a Y-tail, an H-tail, an X-tail, a T-tail, a TT-tail, or a U-tail, and the tilting rotors on the empennage 30 are installed on the upper side of the empennage 30, and tilt upward in the vertical take-off and landing configuration. This reduces the possibility that the rotors hurt passengers when the passengers get in or out of the aircraft. Referring to FIG. 1 to FIG. 17, in an embodiment of the vertical take-off and landing aircraft according to the present disclosure, the empennage 30 is a V-tail, two tilting rotors are installed on the empennage 30, and the two tilting rotors are installed on two ends of wingtips of the upper portion of the empennage 30 respectively. In other embodiments, the empennage may alternatively be in any of the above shapes.

Figure 12:
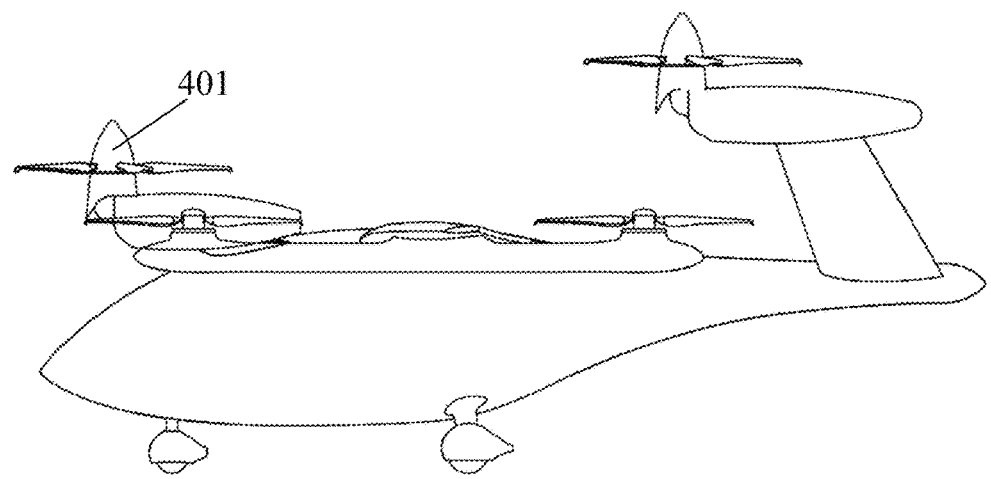
FIG. 12 is a side view of FIG. 11.
Figure 13:
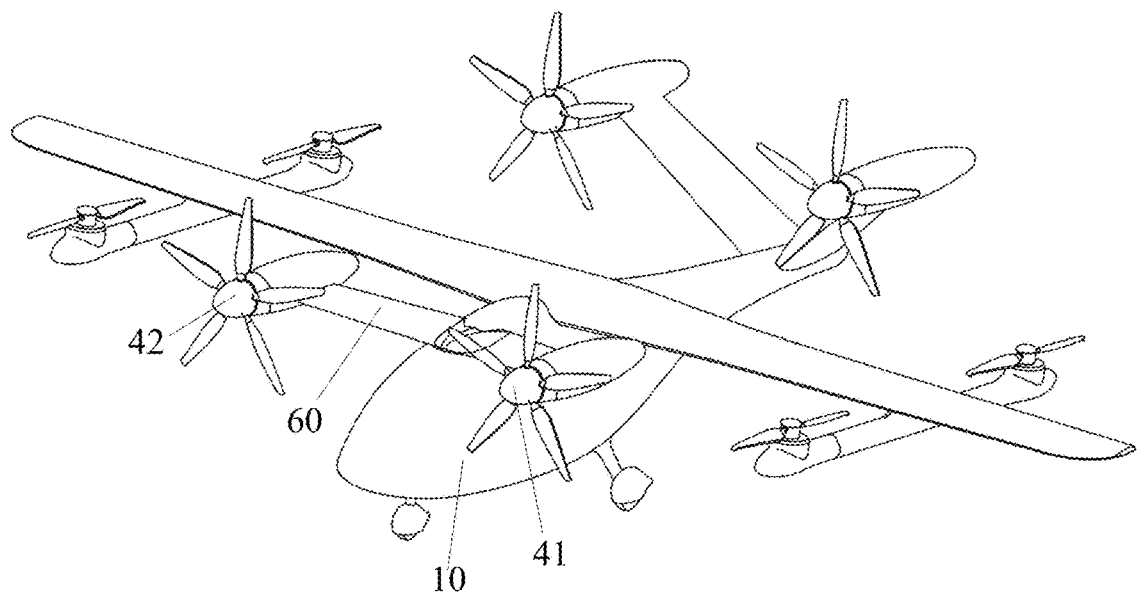
FIG. 13 is an axonometric drawing of the vertical take-off and landing aircraft in FIG. 9 in a level flight state.
Figure 14:
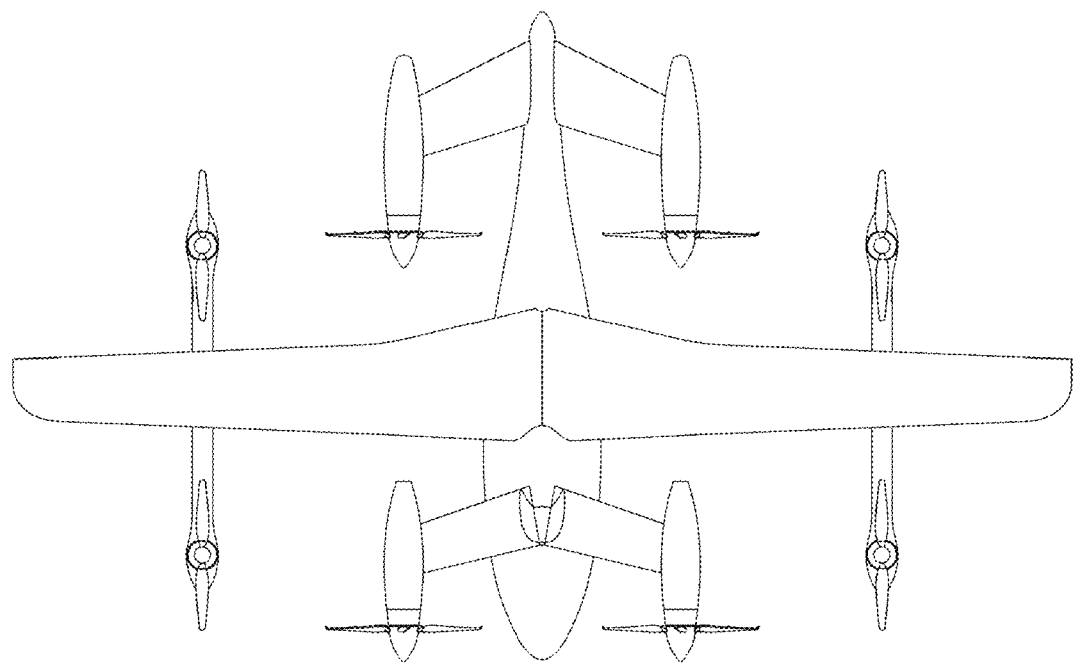
FIG. 14 is a top view of FIG. 13.
Figure 15:
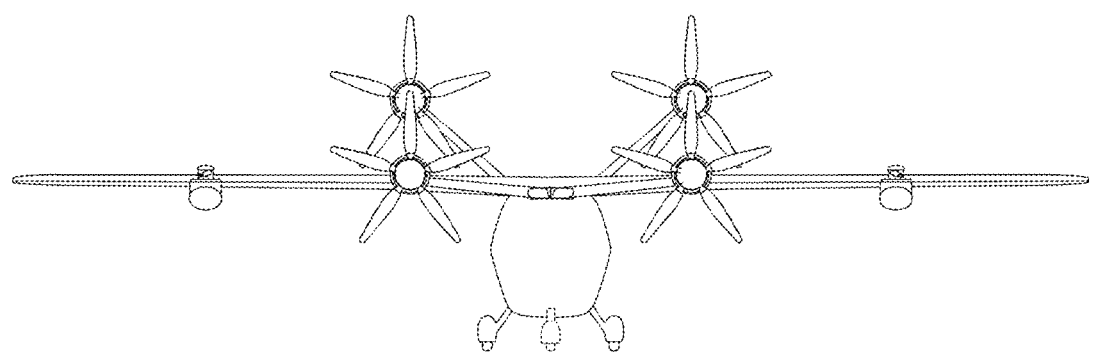
FIG. 15 is a front view of FIG. 13.
Figure 16:
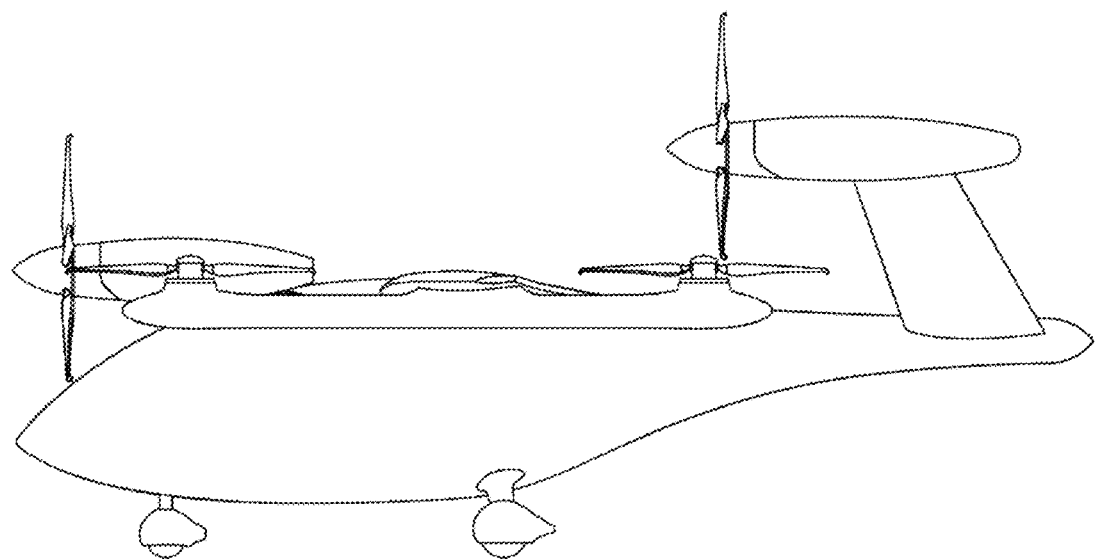
FIG. 16 is a side view of FIG. 15.

Referring to FIG. 12, it should be noted that in the present disclosure, the tilting rotor includes a tilting propeller 401 and a tilting driving device (not shown). A base of the tilting driving device is fixed on the empennage 30 or on the front side of the wing 20, and the tilting propeller 401 is installed at a driving end of the tilting driving device and can tilt and be locked between the horizontal direction and the vertical direction. For specific structures of the above tilting driving device and tilting propeller 401, reference may be made to the prior art, and details are not described herein.

In an embodiment of the vertical take-off and landing aircraft according to the present disclosure, the tilting rotors on the front side of the wing 20 are installed on the fuselage 10 on the front side of the wing 20 by a first support arm 60, and the shape of the first support arm 60 corresponds to the shape of the empennage 30. The tilting rotors on the empennage 30 are higher than the tilting rotors on the front side of the wing 20.

In an embodiment of the present disclosure, each of the fixed rotors includes a folding rotor (not shown) and a device for driving a fixed rotor (not shown). The device for driving a fixed rotor in the present disclosure may be a motor or a combination of a motor and a speed reducer. In this embodiment, the folding rotor includes a fixed blade (not shown) and a floating blade (not shown). When the aircraft is in a hovering stage, the fixed blade and the floating blade rotate in a cross-shape under the driving of the device for driving a fixed rotor. When the aircraft is in a level cruising stage and the device for driving a fixed rotor stops working, the fixed blade and the floating blade are closed in the "-" shape of a favorable current, and the extension direction of each fixed blade and each floating blade is consistent with the heading of the aircraft. This setting can reduce drag during cruising. It should be noted that in the present disclosure, the fixed blade and the floating blade rotate in a cross state during rotation, and folding when the fixed blade and the floating blade stop can be implemented by all existing suitable folding rotor forms, so details are not described herein. Of course, it can be understood by a person skilled in the art that all the fixed rotors in the present disclosure may not be in the form of foldable blades if no better effect is considered.

Figure 17:
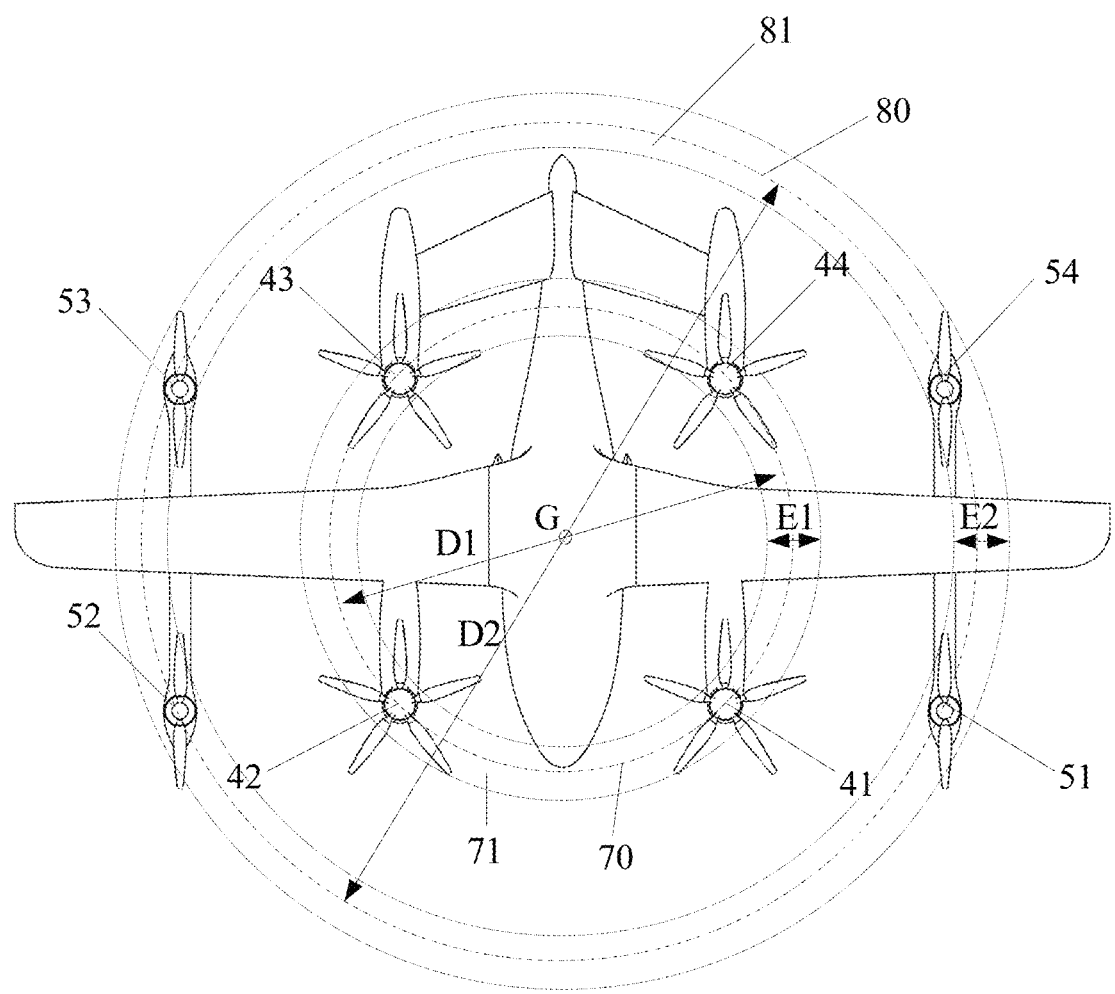
FIG. 17 is a layout analysis diagram of a vertical take-off and landing aircraft according to an embodiment of the present disclosure.
Figure 18:
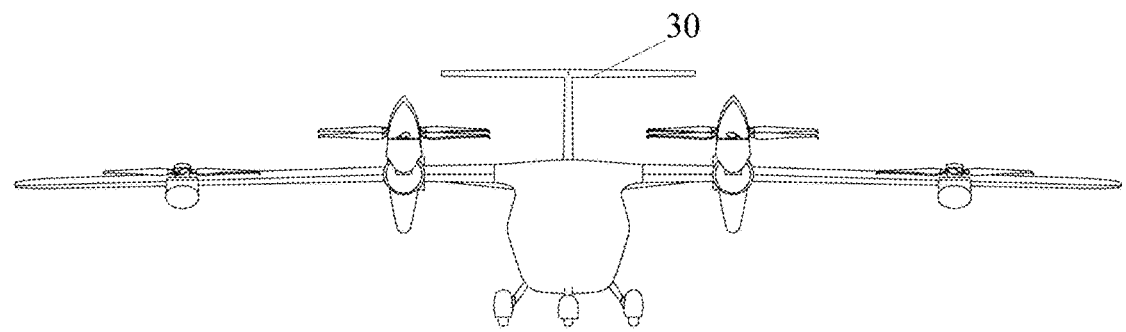
FIG. 18 is a front view of a vertical take-off and landing aircraft according to another embodiment of the present disclosure.
Figure 19:
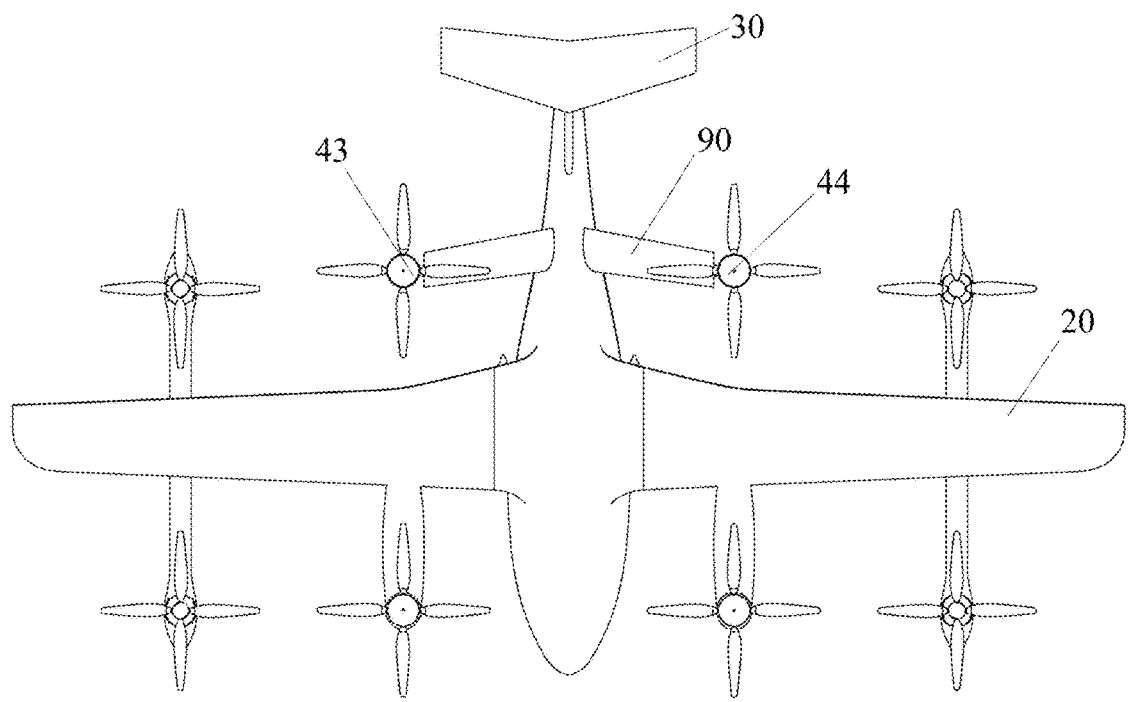
FIG. 19 is a top view of the vertical take-off and landing aircraft in FIG. 18.
Figure 20:
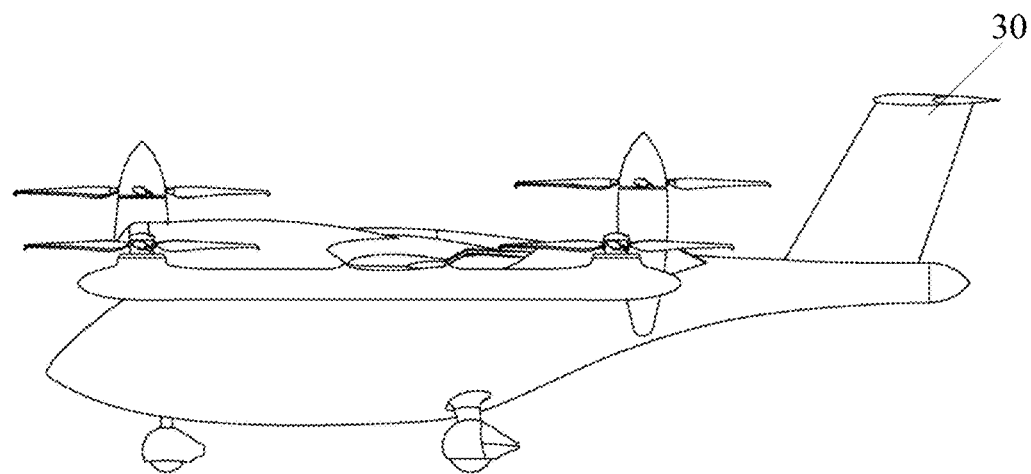
FIG. 20 is a side view of the vertical take-off and landing aircraft in FIG. 18.
Figure 21:
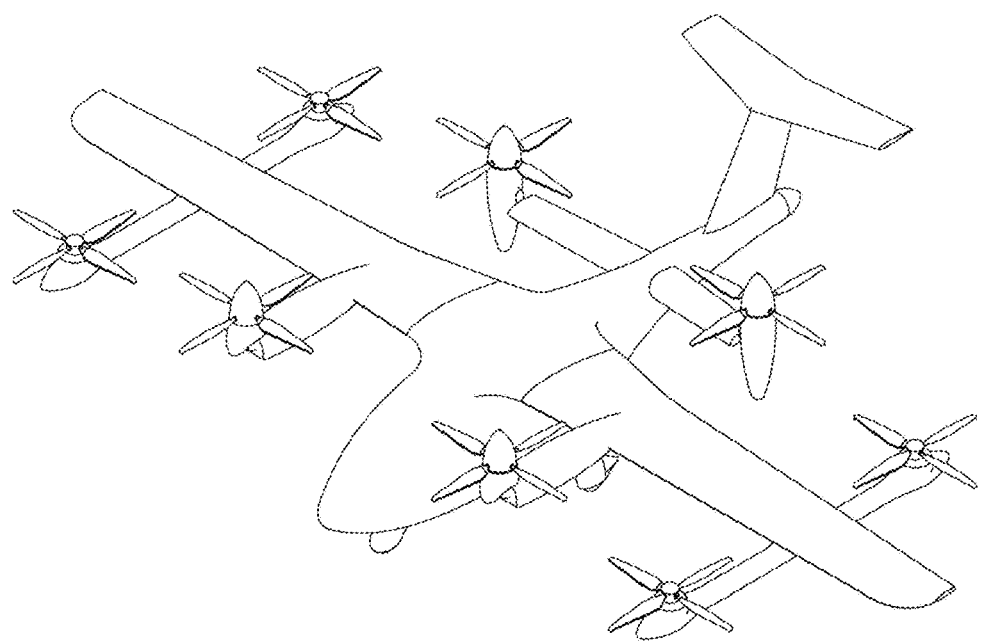
FIG. 21 is an axonometric drawing of the vertical take-off and landing aircraft in FIG. 18 in a vertical take-off and landing configuration.
Figure 22:
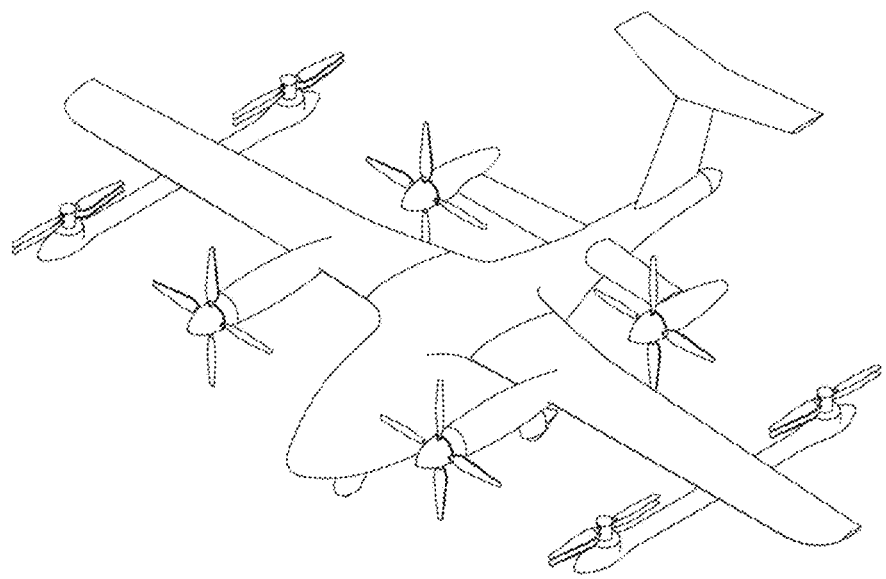
FIG. 22 is an axonometric drawing of the vertical take-off and landing aircraft in FIG. 18 in a level flight state.
Figure 23:
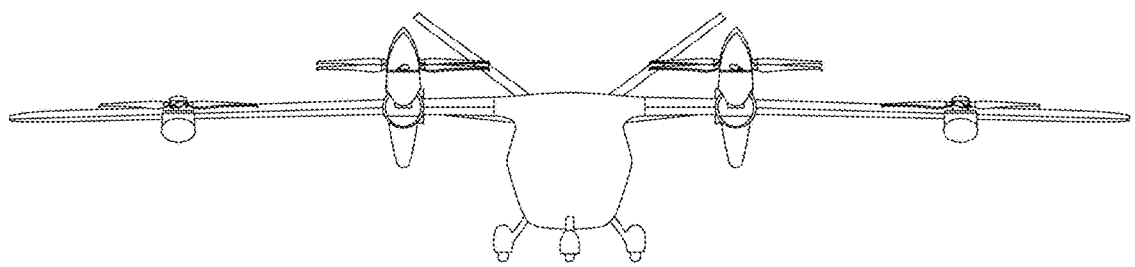
FIG. 23 is a front view of a vertical take-off and landing aircraft according to another embodiment of the present disclosure.
Figure 24:
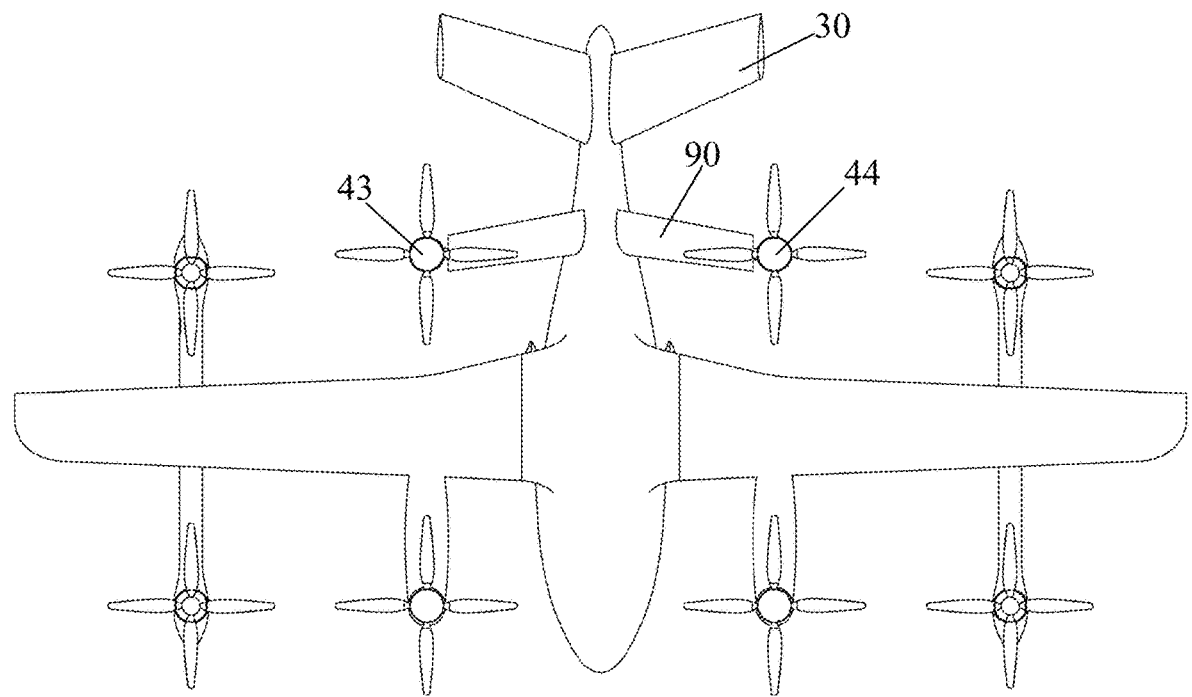
FIG. 24 is a top view of the vertical take-off and landing aircraft in FIG. 23.
Figure 25:
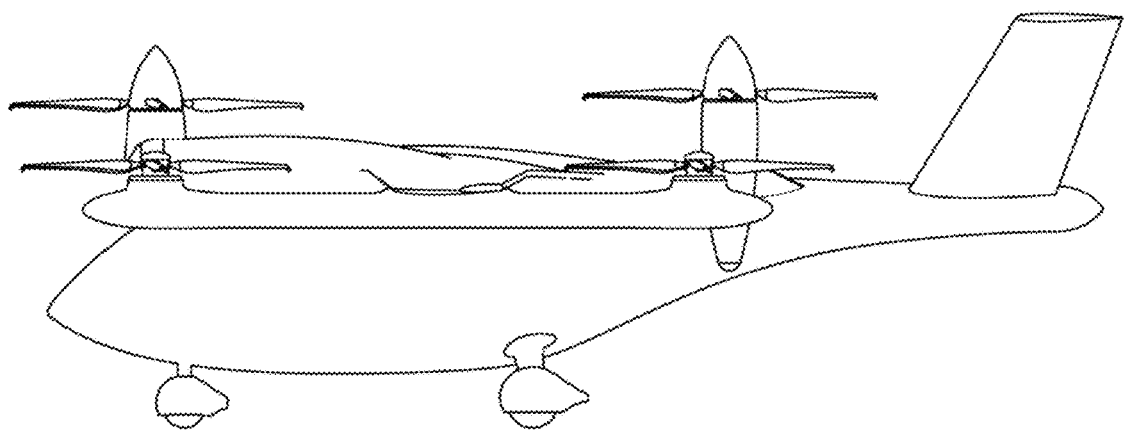
FIG. 25 is a side view of the vertical take-off and landing aircraft in FIG. 23.
Figure 26:
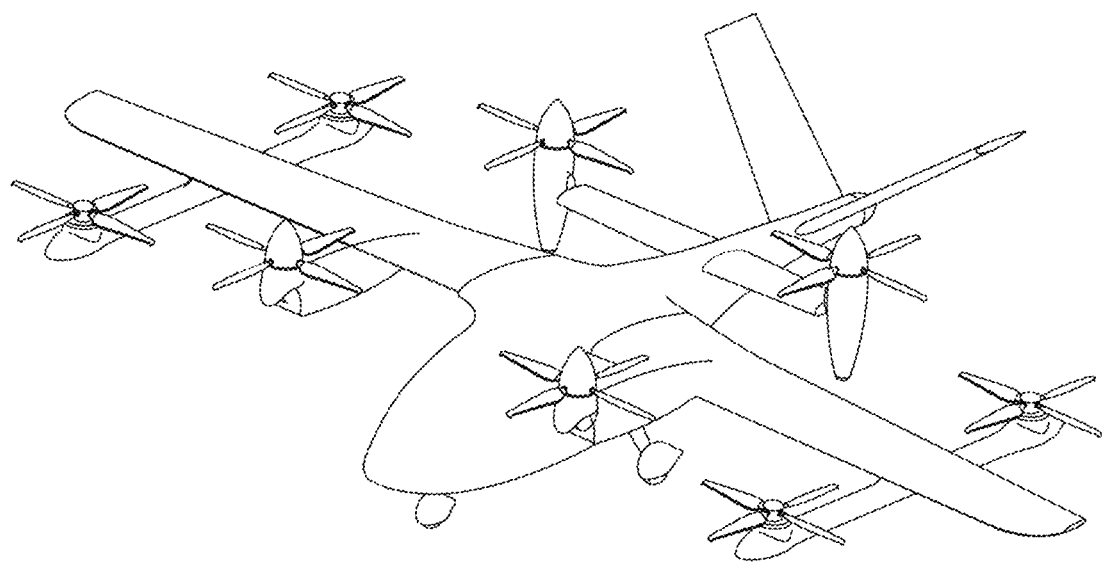
FIG. 26 is an axonometric drawing of the vertical take-off and landing aircraft in FIG. 23 in a vertical take-off and landing configuration.
Figure 27:
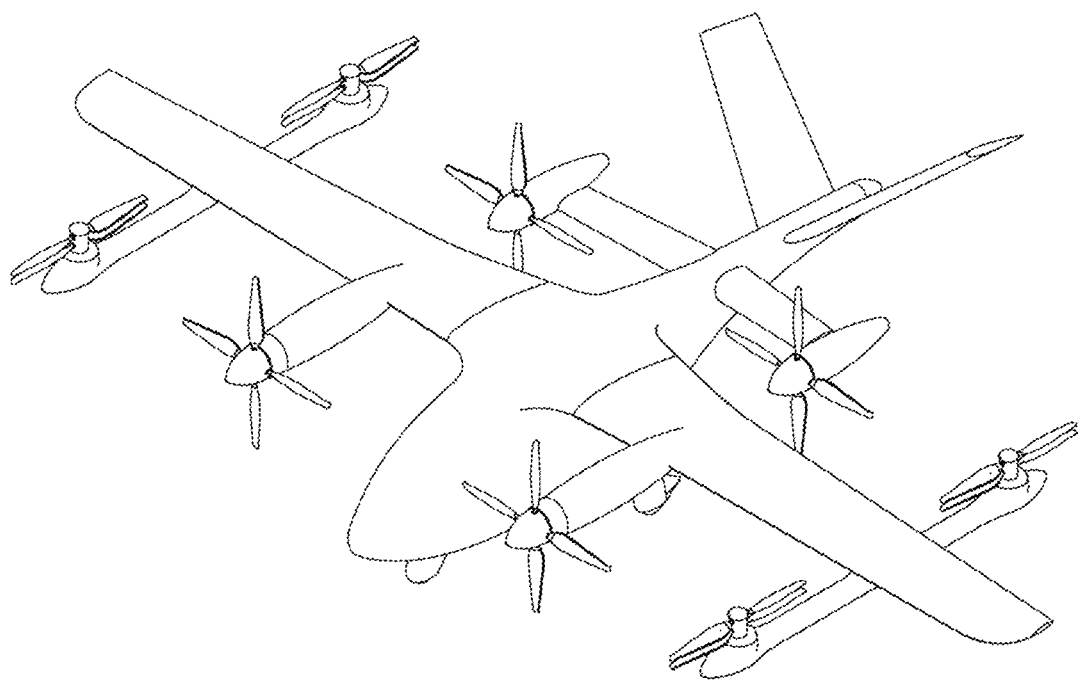
FIG. 27 is an axonometric drawing of the vertical take-off and landing aircraft in FIG. 23 in a level flight state.

It should be noted that due to various factors such as installation, it is impossible to achieve 100% central symmetry ideally. Therefore, the expression of approximate central symmetry is adopted in the present application. Referring to FIG. 17, in the present disclosure, the above tilting rotors are "approximately centrally symmetrical", which means that in an ideal state, with the center of gravity of the vertical take-off and landing aircraft as the center and the first circumference 70 where the tilting rotors are located when in central symmetry in the ideal state as the reference, the diameter of the first circumference 70 is set to D1, and actual installation positions of the tilting rotors are located in a first circular ring 71 of +20% of D1. That is, an inner ring of the first circular ring 71 is formed by radial inward deviation by 20% of D1 from the first circumference 70, and an outer ring of the first circular ring 71 is formed by radial outward deviation by 20% of D1 from the first circumference 70. The first ring 71 has a width E1 of 40% of D1. The above fixed rotors are "approximately centrally symmetrical", which means that in an ideal state, with the center of gravity of the vertical take-off and landing aircraft as the center and the second circumference 80 where the fixed rotors are located when in central symmetry in the ideal state as the reference, the diameter of the second circumference 80 is set to D2, and actual installation positions of the fixed rotors are located in a second circular ring 81 of +20% of D2. That is, an inner ring of the second circular ring 81 is formed by radial inward deviation by 20% of D2 from the second circumference 80, and an outer ring of the second circular ring 81 is formed by radial outward deviation by 20% of D2 from the second circumference 80. The second circular ring 81 has a width E2 of 40% of D2.

The present disclosure further provides a control method for the foregoing vertical take-off and landing aircraft, including: a transition process from vertical take-off to level flight and/or a transition process from level flight to vertical landing as follows:

the transition process from vertical take-off to level flight includes:

tilting, by a power system, the 2N tilting rotors forward on inner sides based on a forward flight command; and configuring a tilting rate of the 2N tilting rotors and a thrust ratio between the 2N tilting rotors and the 2N fixed rotors based on a climb command, so as to control the aircraft's climb rate and climb gradient; and the transition process from level flight to vertical landing includes:

tilting, by the power system, the 2N tilting rotors upward to a vertical take-off and landing position based on a speed command; and configuring a tilting rate of the 2N tilting rotors and a thrust ratio between the 2N tilting rotors and the 2N fixed rotors based on a descent command, so as to control the aircraft's descent rate and descent gradient.

In an embodiment of the control method according to the present disclosure, the control method further includes the process of regulating unexpected entry into a spin or stall and/or the process of regulating when encountering crosswinds as follows:

the process of regulating unexpected entry into a spin or stall includes: starting the 2N fixed rotors to assist in attitude control to recover from the spin or stall state. It should be noted that the spin is a continuous and automatic rotary movement after the angle of attack of a plane exceeds a critical angle of attack. During the spin, the plane rotates along a spiral track with a small radius while descending sharply, and continuously rotates around a roll axis, a pitch axis, and a yaw axis at the same time. The stall is a phenomenon in which the lift coefficient of a wing of an aircraft (mostly referring to a plane) decreases with an increase in the angle of attack when the angle of attack exceeds a critical value. When stalling, the plane is subjected to an uncontrolled dive and bump motion, an engine vibrates, and a pilot feels abnormal manipulation.

The control process in the case of encountering strong crosswind includes: when a wind speed exceeds a set threshold, assisting in controlling yaw by means of a thrust differential between the 2N tilting rotors to resist the crosswind.

Figure 33:
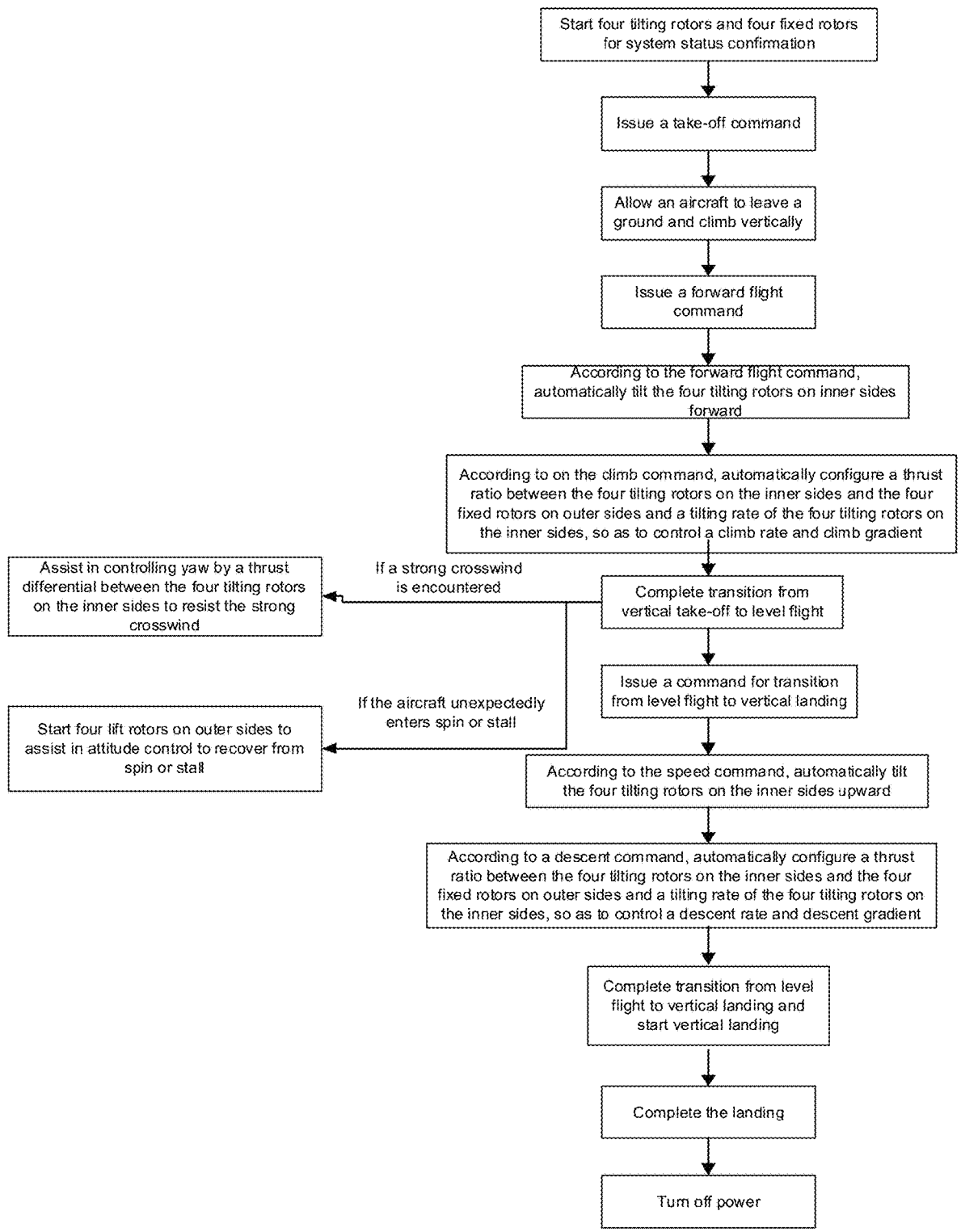
FIG. 33 is a schematic diagram of a control method for a vertical take-off and landing aircraft according to an embodiment of the present disclosure.

Of course, the control method according to the present disclosure may include more control processes. Referring to FIG. 33, with four fixed rotors and four tilting rotors as an example, a control method is provided, including:

starting the four tilting rotors and the four fixed rotors for system status confirmation→if the system status is normal, issuing a take-off command→keeping the four fixed rotors and the four tilting rotors in a vertical take-off and landing position rotating until the aircraft leaves a ground and climbs vertically to a set height→issuing a forward flight command→controlling the four tilting rotors on inner sides to automatically tilt forward based on the forward flight command→automatically configuring a tilting rate of the four tilting rotors and a thrust ratio between the four tilting rotors and the four fixed rotors based on a climb command, so as to control the climb rate and climb gradient until transition from vertical take-off to level flight is completed→issuing a command for transition from level flight to vertical landing→automatically tilting the four tilting rotors on the inner sides upward based on the command for transition from level flight to vertical landing→automatically configuring a tilting rate of the four tilting rotors and a thrust ratio between the four tilting rotors and the four fixed rotors based on a descent command, so as to control a descent rate and descent gradient→completing transition from level flight to vertical landing and starting vertical landing→completing the landing→turning off power.

During level flight, if the aircraft unexpectedly enters a spin or stall, the process of regulating unexpected entry into a spin or stall may be further included. The process of regulating unexpected entry into a spin or stall includes: starting the four fixed rotors to assist in attitude control to change the spin or stall state.

If strong crosswind with a wind speed exceeding a set threshold is encountered, a control process in the case of encountering crosswind may be further included. The control process in the case of encountering crosswind includes: when a wind speed exceeds the set threshold, assisting in controlling yaw by means of a thrust differential between the four tilting rotors to resist the crosswind.

With an electric vertical take-off and landing aircraft with four fixed rotors and four tilting rotors as an example, the vertical take-off and landing aircraft according to the present disclosure has the following advantages.

1) During transition, attitude adjustment can be implemented by using the four fixed rotors and the four tilting rotors together, or only the four fixed rotors are used to implement pitch control by means of a thrust differential between front and rear fixed rotors and implement roll control by means of a thrust differential between left and right fixed rotors, so that a set of independent non-similar three-axis channels is added to control complete functional redundancy, which improves the safety, and can simplify a control algorithm.

2) During level flight, after any single rotor fails, an additional yaw moment can be balanced by a rudder, which can reserve residual power to a maximum extent and ensure that the performance is still high after the single rotor fails. In extreme cases, the aircraft is supported to continue the flight even after two or three rotors fail.

3) During level flight, when an abnormal situation such as control failure of a control surface, stall or spin occurs, the abnormal situation can be corrected by fixed rotors (symmetrically arranged fixed rotors can implement control of six rotation vectors) compared with that in a full thrust vectoring configuration and that in a front semi-tilting configuration. The advantages of the Lift+Cruise are inherited well, and the safety of the level flight process (especially when an altitude reserve is insufficient) is improved.

4) If a tilting actuation function completely fails or the tilting rotor thrust is completely lost, "controllable emergency landing" can still be implemented by fixed rotors, and the safety is improved.

5) If the power system loses energy completely during hovering or transition, the "controllable emergency landing" can be implemented by adjusting a collective pitch of the tilting rotors on inner sides (the control of six rotation vectors can be completed), so as to achieve an autorotative descent ability similar to that of a helicopter.

6) Compared with the layout of the four tilting rotors on the front side of the wing, the four tilting rotors on inner sides have a reduced upwind area, which is beneficial to reducing the drag.

7) Compared with the full thrust vectoring configuration, the aircraft adjusts the descent rate and descent gradient by adjusting the thrust ratio between the four tilting rotors on the inner sides and the four fixed rotors on the outer sides, which is beneficial to take-off and landing in a complex environment in cities.

To sum up, according to the present disclosure, through the special layout, the advantages of the Lift+Cruise, the full thrust vectoring configuration and the partial thrust vectoring configuration can be combined, and this layout can widen a transition corridor, and reduce the research and development difficulty of the vertical take-off and landing aircraft, which is beneficial to rapid advancement of a product commercialization process. Therefore, the present disclosure effectively overcomes some practical problems in the prior art and thus has very high utilization value and significance.

The foregoing embodiments merely illustrate principles and effects of the present disclosure, but are not intended to limit the present disclosure. Any person skilled in the art may modify or alter the foregoing embodiments without departing from the scope of the present disclosure. Therefore, all equivalent modifications or alterations completed by a person of ordinary skill in the art without departing from technical ideas disclosed in the present disclosure shall still be covered by the claims of the present disclosure.

What is claimed is:

1. A vertical take-off and landing aircraft, comprising:
    a fuselage, wherein wings are arranged on two sides of the fuselage, and the wings are of a fixed-wing structure; and an empennage is arranged at a tail of the fuselage;
    2N tilting rotors symmetrically installed on both sides of the fuselage, located at front and rear sides of the wings; and
    2N fixed rotors symmetrically installed on the wings on both sides of the fuselage, located on the front and rear sides of the wings, and positioned on outer sides of the tilting rotors, wherein N is a natural number greater than or equal to 2; in a vertical take-off and landing configuration, projections of all the tilting rotors on a horizontal plane are approximately centrally symmetrical about a center of gravity of the vertical take-off and landing aircraft; and projections of all the fixed rotors on the horizontal plane are approximately centrally symmetrical about the center of gravity of the vertical take-off and landing aircraft.

2. The vertical take-off and landing aircraft according to claim 1, wherein at least some of the 2N tilting rotors are arranged on a front side of the center of gravity, and at least some of the 2N tilting rotors are arranged on a rear side of the center of gravity.

3. The vertical take-off and landing aircraft according to claim 2, wherein the tilting rotors on the front side of the center of gravity are installed on the wing by booms or on the fuselage on the front side of the wing by support arms.

4. The vertical take-off and landing aircraft according to claim 1, wherein the vertical take-off and landing aircraft comprises four tilting rotors and four fixed rotors, the four fixed rotors are symmetrically installed on both sides of the fuselage, and the four tilting rotors are located on inner sides of the four fixed rotors and distributed on the front sides and the rear sides of the wings.

5. The vertical take-off and landing aircraft according to claim 1, wherein the empennage is any one of a V-tail, a Y-tail, an X-tail, a T-tail, an H-tail, a TT-tail, or a U-tail, and some of the tilting rotors are installed on the empennage and are capable of providing forward thrust for forward flight of the aircraft, and tilting upward to provide vertical thrust in the vertical take-off and landing configuration of the aircraft.

6. The vertical take-off and landing aircraft according to claim 5, wherein the empennage is a V-tail, two tilting rotors are installed on the empennage, and the two tilting rotors are installed on wingtips on two ends of an upper portion of the empennage respectively.

7. The vertical take-off and landing aircraft according to claim 1, wherein at least some of the 2N fixed rotors are arranged on a front side of the center of gravity, and at least some of the 2N fixed rotors are arranged on a rear side of the center of gravity.

8. The vertical take-off and landing aircraft according to claim 1, wherein booms are installed on the wings on both sides of the fuselage, and the 2N fixed rotors are symmetrically installed on the booms on both sides of the fuselage, and are located on the front sides and the rear sides of the wings respectively.

9. The vertical take-off and landing aircraft according to claim 1, wherein projections of all tilting rotors on the horizontal plane are approximately centrally symmetric about the center of gravity such that in an ideal state, with the center of gravity as a center and a first circumference of diameter D1, where the 2N tilting rotors are located in a perfectly central symmetry configuration, as a reference, actual positions of the tilting rotors are located in first circular ring of a diameter D1±20% D1, the first circular ring has a width E1 of 40% of D1.

10. The vertical take-off and landing aircraft according to claim 1, wherein projections of all fixed rotors on the horizontal plane are approximately centrally symmetric about the center of gravity such that in an ideal state, with the center of gravity as a center and a second circumference of diameter D2, where the 2N fixed rotors are located in a perfectly central symmetry configuration, as a reference, actual positions of the fixed rotors are located in second circular ring of a diameter D2±20% of D2, the second circular ring has a width E2 of 40% of D2.

11. The vertical take-off and landing aircraft according to claim 1, wherein the 2N tilting rotors comprise at least two full thrust vectoring rotors, and all the full thrust vectoring rotors are symmetrically arranged with respect to a symmetry plane of the fuselage.

12. A control method of the vertical take-off and landing aircraft according to claim 1, comprising: providing the vertical take-off and landing aircraft of claim 1 a transition process from vertical take-off to level flight and/or a transition process from level flight to vertical landing as follows:
    the transition process from vertical take-off to level flight comprises:
    tilting, by a power system, the 2N tilting rotors forward according to a forward flight command;
    configuring a tilting rate of the 2N tilting rotors and a thrust ratio of the 2N tilting rotors to the 2N fixed rotors according to a climb command, so as to control a climb rate and climbing gradient of the aircraft; and
    the transition process from level flight to vertical landing comprises:
    tilting, by the power system, the 2N tilting rotors upward to a vertical take-off and landing position according to a speed command; and
    configuring the tilting rate of the 2N tilting rotors and the thrust ratio of the 2N tilting rotors to the 2N fixed rotors according to a descent command, so as to control a descent rate and descent gradient of the aircraft.

13. The control method according to claim 12, further comprising the process of regulating unexpected entry into a spin or stall and/or the process of regulating when encountering crosswinds:
    the process of regulating unexpected entry into a spin or stall comprises: activating the 2N fixed rotors to assist in attitude control, thereby recovering from the spin or stall; and
    the process of regulating when encountering crosswinds comprises: when the wind speed exceeds a set threshold, assisting yaw control by differentially adjusting the thrust of the 2N tilting rotors to counteract the crosswind.

\* \* \* \* \*